United States Patent
Hayashi et al.

(10) Patent No.: US 12,454,060 B2
(45) Date of Patent: Oct. 28, 2025

(54) CONTROL DEVICE

(71) Applicant: FANUC CORPORATION, Yamanashi (JP)

(72) Inventors: Kouichirou Hayashi, Yamanashi (JP); Tomoyuki Yamamoto, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 18/278,096

(22) PCT Filed: Mar. 22, 2022

(86) PCT No.: PCT/JP2022/013072
§ 371 (c)(1),
(2) Date: Aug. 21, 2023

(87) PCT Pub. No.: WO2022/210078
PCT Pub. Date: Oct. 6, 2022

(65) Prior Publication Data
US 2024/0123623 A1  Apr. 18, 2024

(30) Foreign Application Priority Data
Mar. 29, 2021 (JP) ................... 2021-055120

(51) Int. Cl.
*B25J 9/16* (2006.01)
*B25J 19/02* (2006.01)

(52) U.S. Cl.
CPC ........... *B25J 9/1694* (2013.01); *B25J 9/1674* (2013.01); *B25J 19/02* (2013.01)

(58) Field of Classification Search
CPC ........ B25J 9/1694; B25J 9/1674; B25J 19/02; B25J 13/088; B25J 19/06; B25J 9/0084;
(Continued)

(56) References Cited

U.S. PATENT DOCUMENTS 10,335,962 B1 *  7/2019  Rosenberg ............. B25J 9/1674
2014/0009100 A1 *  1/2014  Sera ....................... B25J 9/1633
                                                                 318/611

FOREIGN PATENT DOCUMENTS

JP   2011-161562   8/2011
JP   2011-167817   9/2011
(Continued)

OTHER PUBLICATIONS

International Search Report issued Jun. 14, 2022 in corresponding International Application No. PCT/JP2022/013072.

*Primary Examiner* — Sze-Hon Kong
*Assistant Examiner* — Esvinder Singh
(74) *Attorney, Agent, or Firm* — Wenderoth, Lind & Ponack, L.L.P.

(57) ABSTRACT

A control device controls a robot in which a sensor is disposed, the control device comprising: a sensor coordinate storage unit for storing coordinate system information of a sensor coordinate system; a sensor setting storage unit for storing setting information; a sensor data receiving unit for receiving sensor data; an axis angle detection unit for detecting an angle of each of a plurality of axes included in the robot; a sensor value estimation unit for estimating a sensor value to be detected; and an anomalous sensor value determination unit for comparing the value of the sensor data and the sensor value estimated by the sensor value estimation unit and determining that the sensor data receiving unit is receiving sensor data from a sensor of another robot if the difference between the value of the sensor data and the estimated sensor value exceeds a preset threshold value.

12 Claims, 15 Drawing Sheets

(58) Field of Classification Search
CPC ...... B25J 9/1607; B25J 9/1651; B25J 9/1653; B25J 19/028; G05B 2219/37388; G05B 2219/40549; G05B 2219/42307; G05B 2219/40163; G05B 2219/40547
See application file for complete search history.

(56) References Cited

FOREIGN PATENT DOCUMENTS

| | | |
|---|---|---|
| JP | 2011-224727 | 11/2011 |
| JP | 2014-14897 | 1/2014 |
| JP | 2017-74647 | 4/2017 |
| JP | 2017-135961 | 8/2017 |
| JP | 2018-118353 | 8/2018 |
| WO | 2020/012983 | 1/2020 |

* cited by examiner

CONTROL DEVICE

TECHNICAL FIELD

The present invention relates to a control device.

BACKGROUND ART

Reducing vibration during a robot's motion to increase speed and path accuracy directly leads to an improvement in production efficiency and quality. Therefore, there is a demand to reduce vibration and path deviation that occur during a robot's motion.

To address such a demand, a method has been proposed to reduce vibration by mounting an acceleration sensor on a robot at a location where vibration is to be eliminated or where high path accuracy is to be achieved, measuring vibration during a robot's motion using the acceleration sensor, and performing learning control. See, for example, Patent Document 1.

In the case of a robot including a sensor that adopts a wired connection method, routing a sensor cable can be complicated. Another method has been therefore proposed to reduce vibration in a robot by mounting a wireless acceleration sensor on the robot. See, for example, Patent Document 2.

Patent Document 1: Japanese Unexamined Patent Application, Publication No. 2011-167817
Patent Document 2: Japanese Unexamined Patent Application, Publication No. 2011-161562

DISCLOSURE OF THE INVENTION

Problems to be Solved by the Invention

In establishing a connection to a wireless acceleration sensor provided on a robot to be controlled, a pairing can be established with an incorrect wireless acceleration sensor provided on another robot. Proceeding with measuring sensor values with a wireless connection to the incorrect wireless acceleration sensor results in unexpected robot control.

A function that notifies a user of an incorrect pairing, if any, is therefore desired.

Means for Solving the Problems (1) One aspect of a control device of the present disclosure is a control device for controlling a robot provided with a sensor, the control device including: a sensor coordinate storage unit configured to store coordinate system information related to a preset sensor coordinate system of the sensor; a sensor setting storage unit configured to store setting information related to communication with the sensor; a sensor data reception unit configured to receive sensor data detected by the sensor based on the setting information; an axis angle detection unit configured to detect an angle of each of a plurality of axes included in the robot; a sensor value estimation unit configured to estimate sensor values to be detected by the sensor, through a forward transformation using the angles of the respective axes detected by the axis angle detection unit and a coordinate transformation of the sensor coordinate system; and a sensor value anomaly determination unit configured to compare values of the sensor data against the sensor values estimated by the sensor value estimation unit, and determine that the sensor data reception unit is receiving sensor data from a sensor provided on another robot if a difference between the values of the sensor data and the estimated sensor values is greater than a preset threshold.

(2) One aspect of a control device of the present disclosure is a control device for controlling a robot provided with a sensor, the control device including: a sensor coordinate storage unit configured to store coordinate system information related to a preset sensor coordinate system of the sensor; a sensor setting storage unit configured to store setting information related to communication with the sensor; a sensor data reception unit configured to receive sensor data detected by the sensor based on the setting information; a sensor physical quantity computation unit configured to calculate a physical quantity from the sensor data; an axis angle detection unit configured to detect an angle of each of a plurality of axes included in the robot; a sensor physical quantity estimation unit configured to estimate a physical quantity related to the sensor through a forward transformation using the angles of the respective axes detected by the axis angle detection unit and a coordinate transformation of the sensor coordinate system; and a sensor value anomaly determination unit configured to compare the physical quantity calculated from the sensor data against the physical quantity estimated by the sensor physical quantity estimation unit, and determine that the sensor data reception unit is receiving sensor data from a sensor provided on another robot if a difference between the calculated physical quantity and the estimated physical quantity is greater than a preset threshold.

(3) One aspect of a control device of the present disclosure is a control device for controlling a robot among a plurality of robots each provided with a sensor, the control device including: a sensor coordinate storage unit configured to store coordinate system information related to a preset sensor coordinate system of the sensor provided on the robot to be controlled; a sensor data reception unit configured to receive sensor data detected by each of the sensors provided on the respective robots including the robot to be controlled; an axis angle detection unit configured to detect an angle of each of a plurality of axes included in the robot to be controlled; a sensor value estimation unit configured to estimate sensor values to be detected by the sensor of the robot to be controlled, through a forward transformation using the angles of the respective axes detected by the axis angle detection unit and a coordinate transformation of the sensor coordinate system; and an appropriate sensor determination unit configured to compare, for each of the sensors provided on the respective robots, values of the sensor data from the sensor against the sensor values estimated by the sensor value estimation unit, and determine that the sensor is provided on a robot other than the robot to be controlled if a difference between the sensor data and the estimated sensor values is greater than a preset threshold.

(4) One aspect of a control device of the present disclosure is a control device for controlling a robot among a plurality of robots each provided with a sensor, the control device including: a sensor coordinate storage unit configured to store coordinate system information related to a preset sensor coordinate system of the sensor provided on the robot to be controlled; a sensor data reception unit configured to receive sensor data detected by each of the sensors provided on the respective robots including the robot to be controlled; a sensor physical quantity computation unit configured to calculate a physical quantity from the sensor data from each of the sensors provided on the respective robots; an axis angle detection unit configured to detect an angle of each of a plurality of axes included in the robot to be controlled; a sensor physical quantity estimation unit configured to estimate a physical quantity related to the sensor of the robot to be controlled, through a forward transformation using the angles of the respective axes detected by the axis angle detection unit and a coordinate transformation of the sensor coordinate system; and an appropriate sensor determination unit configured to compare, for each of the sensors provided on the respective robots, the physical quantity calculated from the sensor data from the sensor against the physical quantity estimated by the sensor physical quantity estimation unit, and determine that the sensor is provided on a robot other than the robot to be controlled if a difference between the physical quantity calculated from the sensor data and the estimated physical quantity is greater than a preset threshold.

Effects of the Invention

The present invention makes it possible to prevent a robot from operating with an incorrect sensor connection.

PREFERRED MODE FOR CARRYING OUT THE INVENTION

First Embodiment

The following describes a configuration of the present embodiment in detail with reference to the drawings. The present embodiment is described using, as an example, a configuration in which a wireless acceleration sensor is used as a sensor. It should be noted that the present invention is also applicable to a configuration in which a gyroscope sensor, an inertial sensor, or the like is used as the sensor, and a configuration in which a smart device, such as a smartphone, that includes one or more sensors is used as the sensor.

Figure 1:
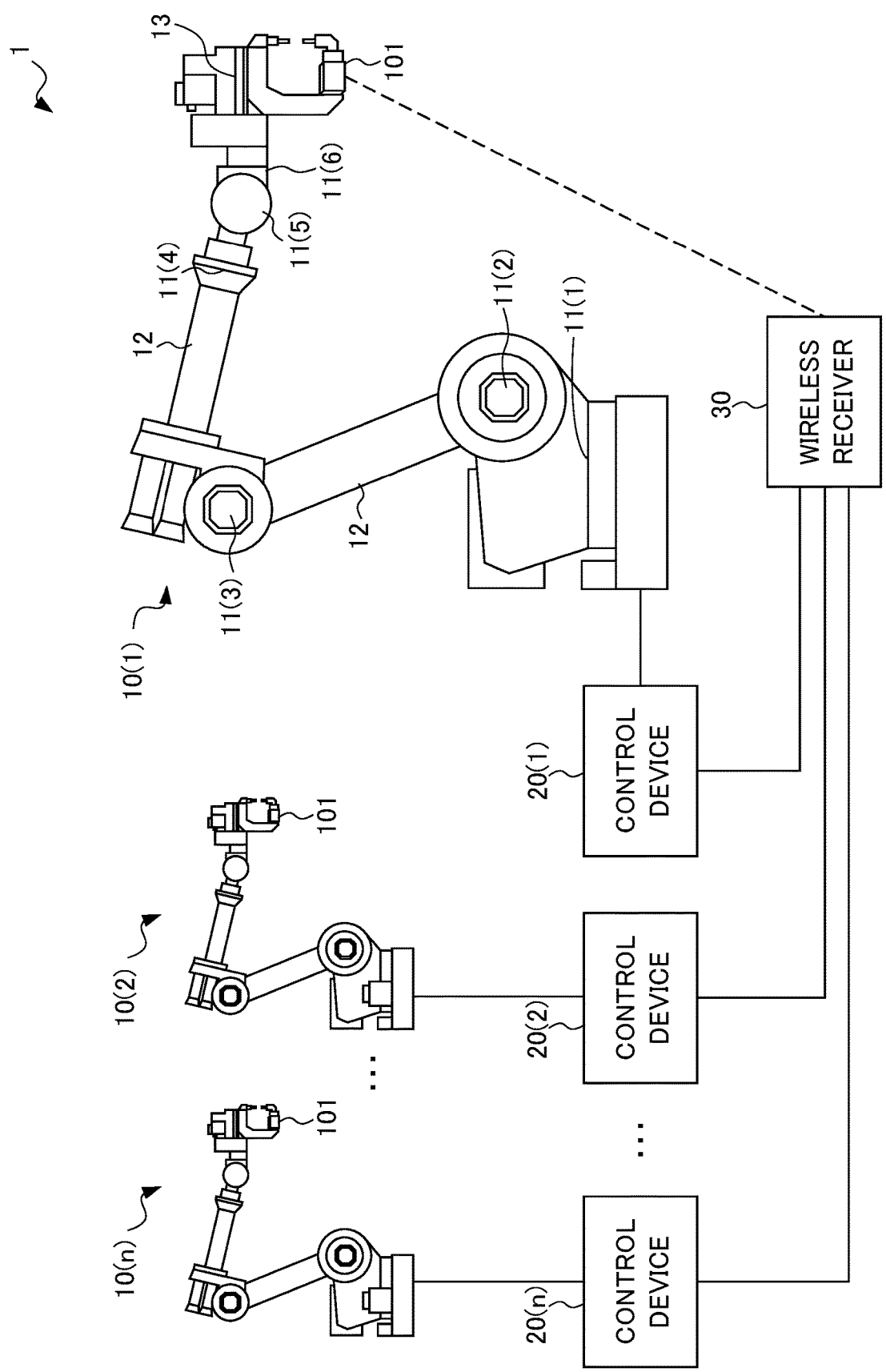
FIG. 1 is a functional block diagram illustrating an example of a functional configuration of a robot system according to a first embodiment.

FIG. 1 is a functional block diagram illustrating an example of a functional configuration of a robot system according to a first embodiment.

As illustrated in FIG. 1, a robot system 1 includes n robots 10(1) to 10(n), n control devices 20(1) to 20(n), and a wireless receiver 30 (n is an integer equal to or greater than 2).

The robots 10(1) to 10(n), the control devices 20(1) to 20(n), and the wireless receiver 30 may be directly connected to each other via connection interfaces, not shown. The robots 10(1) to 10(n) and the control devices 20(1) to 20(n) may be connected to each other via a network such as a local area network (LAN). In this case, the robots 10(1) to 10(n) and the control devices 20(1) to 20(n) may each have a communication unit, not shown, for communicating with each other through such a connection.

Hereinafter, the robots 10(1) to 10(n) may also be collectively referred to as "robot 10", provided that the robots 10(1) to 10(n) do not need to be distinguished from one another. Likewise, the control devices 20(1) to 20(n) may be collectively referred to as "control device 20", provided that the control devices 20(1) to 20(n) do not need to be distinguished from one another.

<Robot 10>

As shown in FIG. 1, the robot 10 is, for example, a six-axis vertical articulated robot having six joint axes 11(1) to 11(6) and arms 12 connected by the joint axes 11(1) to 11(6). The robot 10 drives movable members such as the arms 12 by driving each of servomotors, not shown, disposed in the respective joint axes 11(1) to 11(6) based on drive commands from the control device 20. An end effector 13 such as a welding gun, a gripping hand, or a laser irradiator is attached to the distal end of a movable member of the robot 10, for example, the distal end of the joint axis 11(6). A wireless acceleration sensor 101 is provided on the end effector 13.

Although the robot 10 is described as a six-axis vertical articulated robot, the robot 10 may be, for example, a multi-axis vertical articulated robot other than the six-axis vertical articulated robot, a horizontal articulated robot, or a parallel-link robot.

Figure 2A:
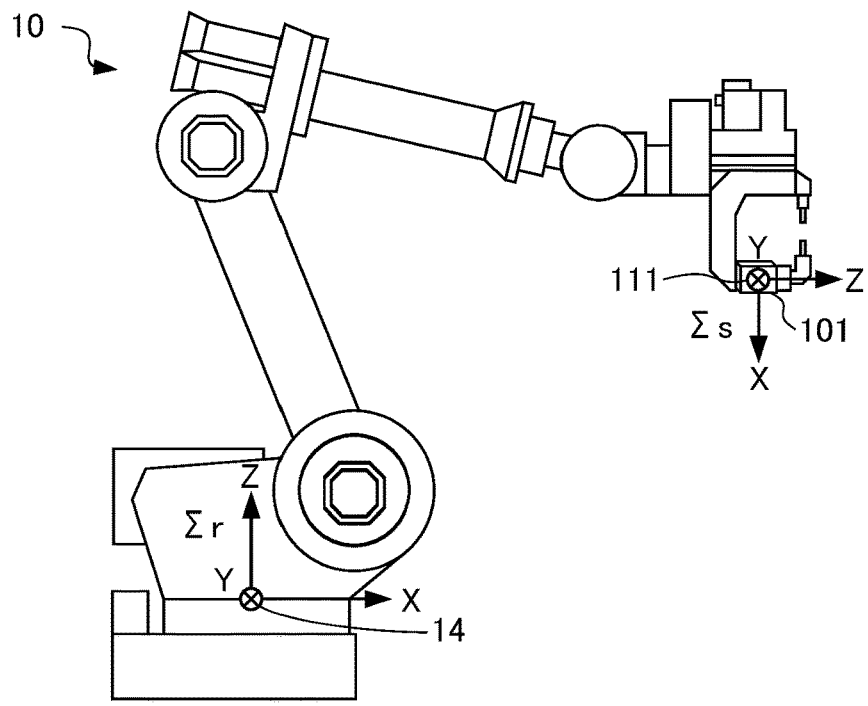
FIG. 2A is a diagram for describing coordinate systems in a robot in FIG. 1.
Figure 2B:
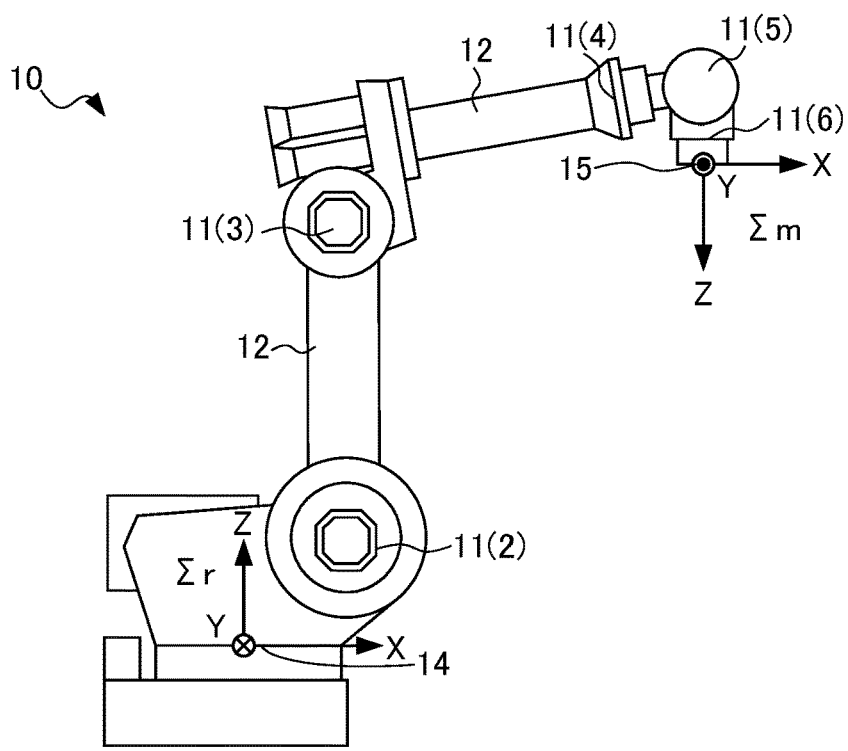
FIG. 2B is a diagram for describing coordinate systems in the robot in FIG. 1.

FIGS. 2A and 2B are diagrams for describing coordinate systems in the robot 10 in FIG. 1.

As shown in FIG. 2A, the robot 10 has a robot reference point 14 and a robot coordinate system Σr centered on the robot reference point 14. The wireless acceleration sensor 101 has a sensor reference point 111 and a sensor coordinate system Σs centered on the sensor reference point 111.

As shown in FIG. 2B, the robot 10 has a robot tip point 15 and a mechanical interface coordinate system Σm centered on the robot tip point 15 at a flange on the distal end of the joint axis 11(6).

The positional relationship between the mechanical interface coordinate system Σm and the sensor coordinate system Σs can be defined in the mechanical interface coordinate system Σm using the following six elements: a vector (x, y, z) from the origin of the mechanical interface coordinate system Σm to the origin of the sensor coordinate system Σs and rotation angles (w, p, r) that define the direction of the sensor coordinate system Σs through rotations around the axes of the mechanical interface coordinate system Σm. The vector (x, y, z) and the rotation angles (w, p, r) can be determined using a known method (e.g., Japanese Unexamined Patent Application, Publication No. 2017-74647).

Thus, the control device 20 described below can calculate the position of the wireless acceleration sensor 101 in the robot coordinate system Σr from coordinates and angles described in a robot motion program by calculating the distance from the robot tip point 15 on the joint axis 11(6) to the origin of the sensor coordinate system Σs using the vector (x, y, z) and the rotation angles (w, p, r).

The wireless acceleration sensor 101 is, for example, a three-dimensional acceleration sensor that periodically detects acceleration in each of the X, Y, and Z axes of the sensor coordinate system Σs at the distal end of the movable member resulting from a motion of the robot 10, using a predetermined sampling time. The wireless acceleration sensor 101 has a clock unit, not shown. Each time the wireless acceleration sensor 101 detects acceleration, the wireless acceleration sensor 101 obtains, as a clock time of the detection, clock time information outputted from the clock unit. The wireless acceleration sensor 101 wirelessly transmits, for example, a sensor signal containing the clock time information and the detected acceleration in each axis, to the wireless receiver 30.

Although the wireless acceleration sensor 101 is described as being configured to wirelessly transmit the sensor signal containing the clock time information and the detected acceleration to the wireless receiver 30, the wireless acceleration sensor 101 may be connected to the control device 20 and transmit the sensor signal to the control device 20 in a wired manner.

Furthermore, the wireless acceleration sensor 101 is not limited to an acceleration sensor, and may be any sensor such as a gyroscope sensor, an inertial sensor, a force sensor, a laser tracker, a vision sensor, or a motion capture sensor. The wireless acceleration sensor 101 may alternatively be a smart device, such as a smartphone, that includes a plurality of sensors including, for example, an acceleration sensor.

<Wireless Receiver 30>

The wireless receiver 30 is, for example, a Wi-Fi (registered trademark) router. The wireless receiver 30 receives the sensor signal from the wireless acceleration sensor 101 and outputs the received sensor signal to the control device 20.

It should be noted that the communication standard for the wireless communication is not limited to Wi-Fi (registered trademark), and may alternatively be based on radio waves such as Bluetooth (registered trademark) or infrared communication.

Preferably, the wireless receiver 30 uses a module in accordance with the communication standard.

<Control Device 20>

The control device 20 (also referred to as "robot controller") controls motions of the robot 10 by outputting drive commands to the robot 10 based on the motion program so as to reduce vibration that occurs in the arms 12 of the robot 10 in motion by performing learning control using the acceleration detected by the wireless acceleration sensor 101.

Figure 3:
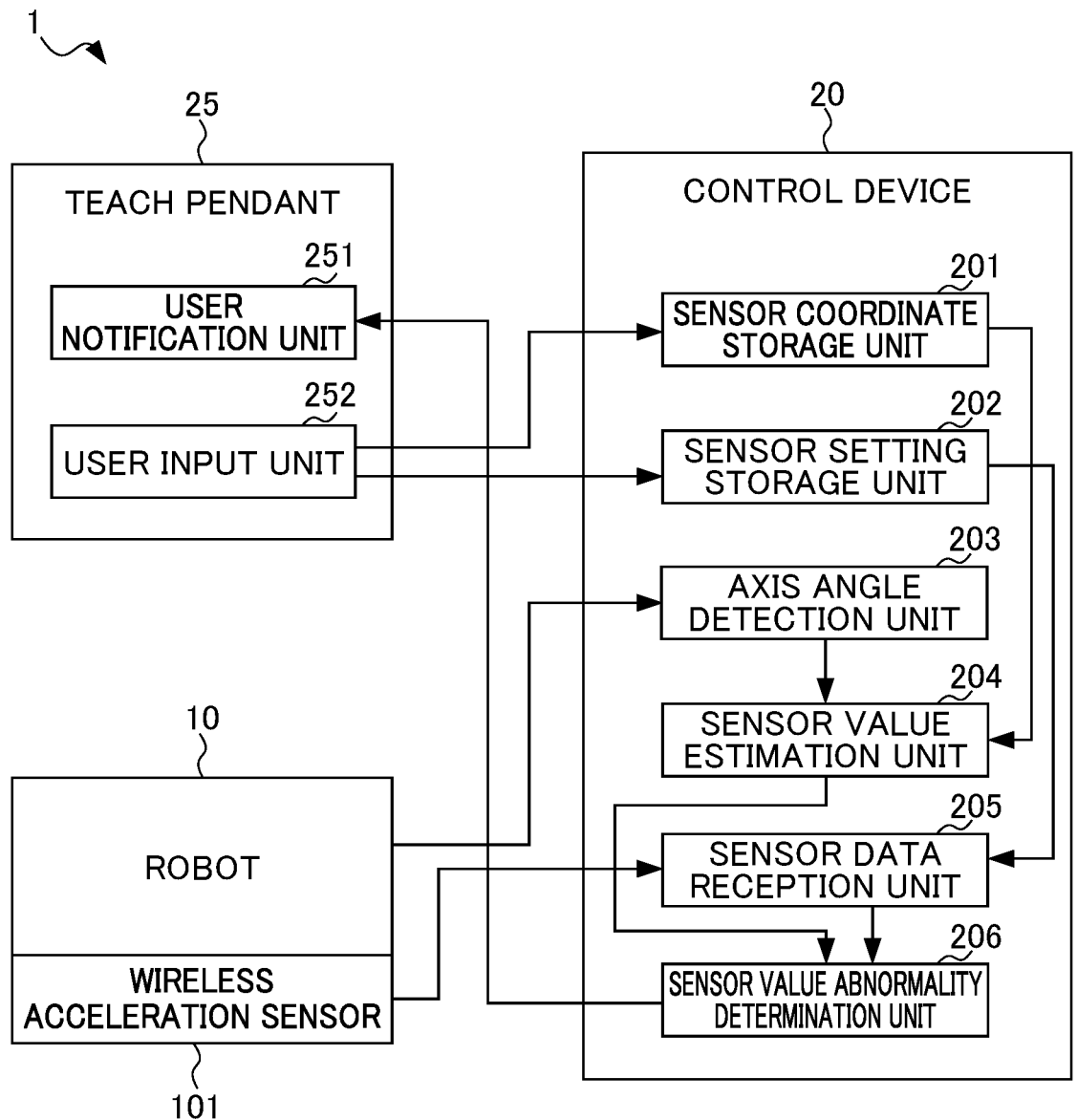
FIG. 3 is a functional block diagram illustrating an example of a functional configuration of a control device.

FIG. 3 is a functional block diagram illustrating an example of a functional configuration of the control device 20.

As illustrated in FIG. 3, the control device 20 according to the present embodiment is connected to a teach pendant 25, and includes a sensor coordinate storage unit 201, a sensor setting storage unit 202, an axis angle detection unit 203, a sensor value estimation unit 204, a sensor data reception unit 205, and a sensor value anomaly determination unit 206. The teach pendant 25 includes a user notification unit 251 and a user input unit 252.

It should be noted that the control device 20 includes an arithmetic processor, not shown, such as a central processing unit (CPU) to implement operation of the functional blocks shown in FIG. 3. The control device 20 also includes an auxiliary storage device, not shown, such as read only memory (ROM) or a hard disk drive (HDD) that stores therein various control programs, and a main storage device, not shown, such as random access memory (RAM) for storing data to be temporarily needed for the arithmetic processor to execute the programs.

In the control device 20, the arithmetic processor reads an OS and application software from the auxiliary storage device, and performs arithmetic processing based on the OS and the application software while deploying the read OS and application software into the main storage device. Based on the results of the arithmetic processing, the control device 20 controls each piece of hardware. In this way, processing by the functional blocks in FIG. 3 is implemented. That is, the control device 20 can be implemented through cooperation of hardware and software.

The sensor coordinate storage unit 201 is, for example, memory such as RAM, and stores therein coordinate system information related to the sensor coordinate system Σs of the wireless acceleration sensor 101. The sensor coordinate system Σs is preset based on a user input operation through the user input unit 252 of the teach pendant 25 described below.

Specifically, the sensor coordinate storage unit 201 stores, as the coordinate system information, the vector (x, y, z) from the origin of the mechanical interface coordinate system Σm to the origin of the sensor coordinate system Σs and the rotation angles (w, p, r) that define the direction of the sensor coordinate system Σs through rotations around the axes of the mechanical interface coordinate system Σm, which are necessary to calculate the position and the pose of the wireless acceleration sensor 101.

The sensor setting storage unit 202 is, for example, memory such as RAM and stores therein setting information related to communication with the wireless acceleration sensor 101 based on a user input operation through the user input unit 252 of the teach pendant 25 described below.

Specifically, the sensor setting storage unit 202 stores, as the setting information, a communication address (e.g., IP address or MAC address) of the wireless acceleration sensor 101, which is a communication partner.

The axis angle detection unit 203 detects, for example, an angle of each of the joint axes 11(1) to 11(6) using encoders or the like, not shown, disposed on the respective joint axes 11(1) to 11(6) of the robot 10.

The axis angle detection unit 203 outputs the detected angles of the respective joint axes 11(1) to 11(6) to the sensor value estimation unit 204.

The sensor value estimation unit 204 estimates sensor values to be detected by the wireless acceleration sensor 101 at the mounting position of the wireless acceleration sensor 101 through a forward transformation using the angles of the respective joint axes 11(1) to 11(6) detected by the axis angle detection unit 203 and a coordinate transformation of the sensor coordinate system Σs.

Specifically, the sensor value estimation unit 204 calculates the position and the pose of the mechanical interface coordinate system Σm in the robot coordinate system Σr by performing a forward transformation using the angles of the respective joint axes 11(1) to 11(6) detected by the axis angle detection unit 203. The sensor value estimation unit 204 calculates the mounting position of the wireless acceleration sensor 101 in the robot coordinate system Σr using the coordinate system information indicating the vector (x, y, z) and the rotation angles (w, p, r) stored in the sensor coordinate storage unit 201. The sensor value estimation unit 204 calculates the acceleration in each axis of the robot coordinate system Σr by performing a second derivative of time-series data of the calculated position with respect to time, and converts the calculated acceleration into sensor values of the acceleration in each axis of the sensor coordinate system Σs via the mechanical interface coordinate system Σm. In this way, the sensor value estimation unit 204 estimates the sensor values. When the robot 10 is in motion, the sensor value estimation unit 204 subtracts a gravitational acceleration component from the estimated sensor values of the acceleration in the sensor coordinate system Σs, and outputs the thus calculated sensor values to the sensor value anomaly determination unit 206.

When the robot 10 is stationary, the sensor value estimation unit 204 may output the estimated sensor values of the acceleration in the sensor coordinate system Σs to the sensor value anomaly determination unit 206 without subtracting the gravitational acceleration therefrom.

The sensor data reception unit 205 receives sensor data detected by the wireless acceleration sensor 101 based on the setting information stored in the sensor setting storage unit 202.

Specifically, the sensor data reception unit 205 pairs with the wireless acceleration sensor 101 based on the communication address in the setting information stored in the sensor setting storage unit 202. For example, the sensor data reception unit 205 receives a sensor signal having a header containing the communication address of the wireless acceleration sensor 101 that the sensor data reception unit 205 has paired with, among sensor signals that are received via the wireless receiver 30. The sensor data reception unit 205 outputs the acceleration in each axis of the sensor coordinate system Σs contained in the received sensor signal as sensor data to the sensor value anomaly determination unit 206.

It should be noted that the sensor data reception unit 205 may remove noise using a low-pass filter (not shown) before outputting the sensor data to the sensor value anomaly determination unit 206.

The sensor value anomaly determination unit 206 compares, with respect to each axis of the sensor coordinate system Σs, the values of the sensor data outputted from the sensor data reception unit 205 against the sensor values estimated by the sensor value estimation unit 204. The sensor value anomaly determination unit 206 determines that the sensor data reception unit 205 is receiving sensor data from a wireless acceleration sensor 101 provided on another robot 10 if the largest difference among differences between the values of the sensor data with respect to each axis and the estimated sensor values is greater than a preset threshold (e.g., "2 m/s$^2$"). The sensor value anomaly determination unit 206 outputs the determination result to the user notification unit 251 of the teach pendant 25 described below.

Figure 4A:
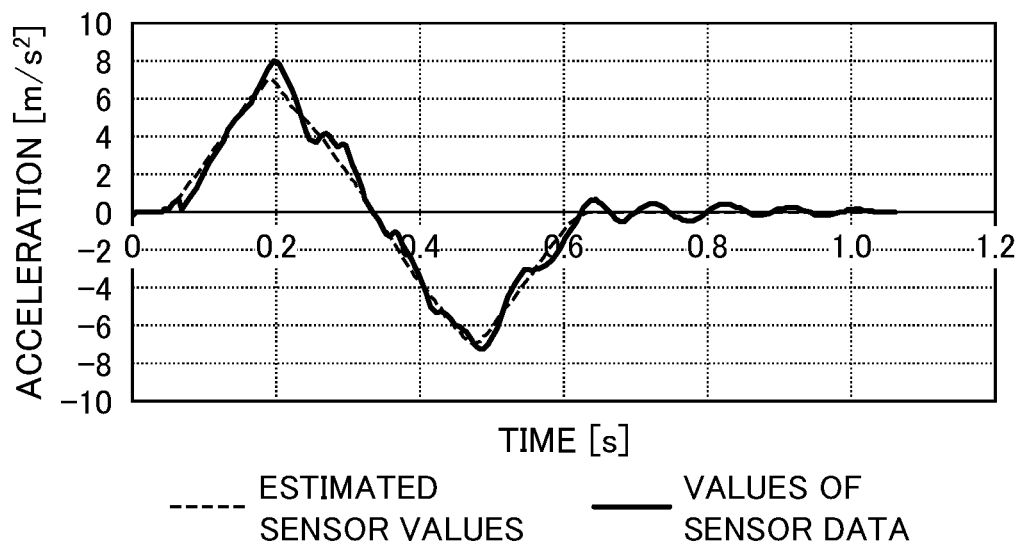
FIG. 4A is a diagram showing an example of comparison between values of sensor data and estimated sensor values.
Figure 4B:
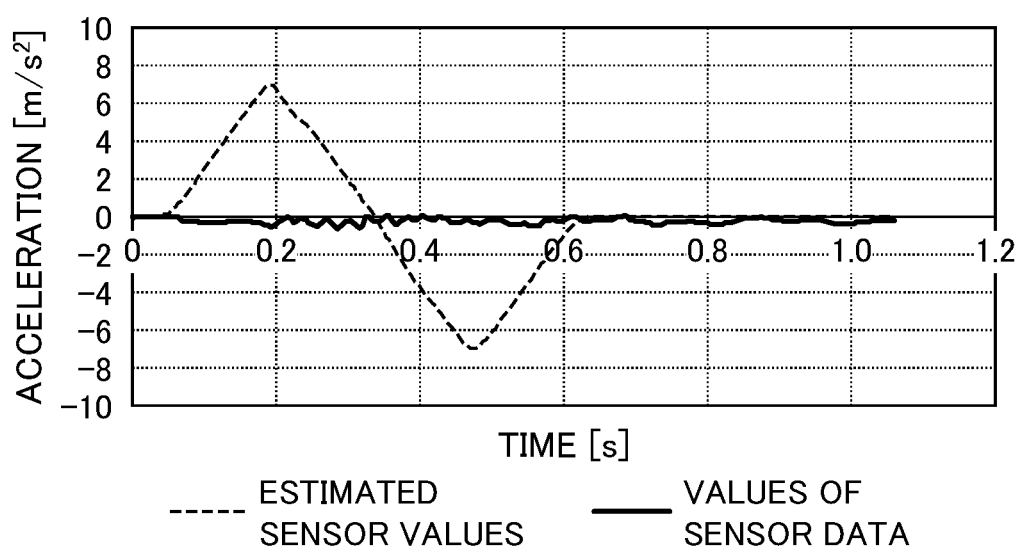
FIG. 4B is a diagram showing an example of comparison between values of sensor data and estimated sensor values.

FIGS. 4A and 4B are diagrams each showing an example of comparison between values of sensor data and estimated sensor values. FIG. 4A shows, as an example, a normal case where the differences between the values of the sensor data with respect to the X-axis direction of the sensor coordinate system Σs and the estimated sensor values when the robot is in motion are equal to or less than the threshold. FIG. 4B shows an anomalous case where any of the differences between the values of the sensor data with respect to the X-axis direction of the sensor coordinate system Σs and the estimated sensor values when the robot is in motion is greater than the threshold.

It should be noted that the sensor value anomaly determination unit 206 is not limited to being configured to calculate the differences between the values of the sensor data and the estimated sensor values with respect to each axis of the sensor coordinate system Σs, and compare the calculated differences against a preset threshold. For example, the sensor value anomaly determination unit 206 may calculate differences between the magnitude of a vector that is a value of sensor data with respect to each axis of the sensor coordinate system Σs and the magnitude of a vector that is a sensor value estimated with respect to each axis of the sensor coordinate system Σs, and compare the calculated differences against a threshold.

Alternatively, using a predetermined function that uses the acceleration in each axis of the sensor coordinate system Σs as a variable, the sensor value anomaly determination unit 206 may calculate differences between values calculated by inputting the values of sensor data with respect to each axis of the sensor coordinate system Σs to the predetermined function and values calculated by inputting the sensor values estimated with respect to each axis of the sensor coordinate system Σs to the predetermined function, and compare the calculated differences against a threshold.

Based on the result of the determination by the sensor value anomaly determination unit 206, the user notification unit 251 outputs an alert notifying that there is an anomaly in the values of the sensor data.

Specifically, if there is an anomaly in the values of the sensor data, the user notification unit 251 displays an alert notifying the user of the anomaly on a display unit, such as a liquid crystal display, included in the teach pendant 25.

It should be noted that the user notification unit 251 may output, along with the alert, the setting information stored in the sensor setting storage unit 202 and the values of the sensor data received by the sensor data reception unit 205.

This configuration allows the user to check, for example, whether or not the setting information stored in the sensor setting storage unit 202 is incorrect and whether or not the wireless acceleration sensor 101 is experiencing a malfunction. In a case where the setting information is incorrect, the user can re-set the correct setting information through the user input unit 252 of the teach pendant 25 described below. In a case where the wireless acceleration sensor 101 is experiencing a malfunction, the user can quickly respond to the anomaly in the sensor values by replacing the wireless acceleration sensor 101 with a new wireless acceleration sensor 101.

It should be noted that the user notification unit 251, which is described as being provided on the teach pendant 25, may alternatively be provided on the control device 20.

The user input unit 252 is, for example, operation keys or a touch panel provided on the teach pendant 25 and receives, from the user, input such as the settings of the sensor coordinate system Σs and the communication address of the wireless acceleration sensor 101. The user input unit 252 outputs the received input to the control device 20.

It should be noted that the user input unit 252, which is described as being provided on the teach pendant 25, may alternatively be provided on the control device 20.

<Anomaly Determination Processing in Control Device 20>

Figure 5:
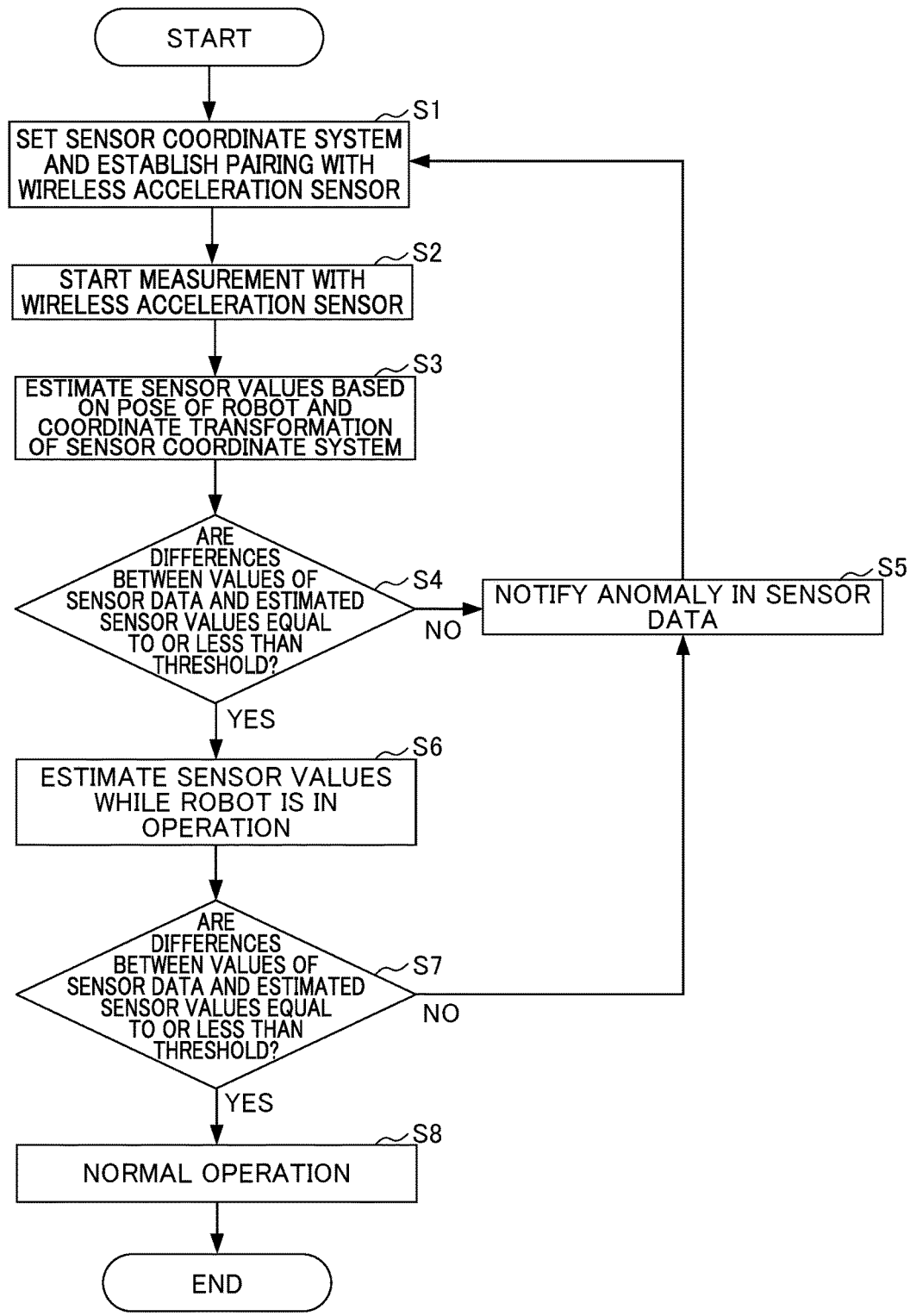
FIG. 5 is a flowchart for describing anomaly determination processing in the control device.

The following describes a flow of anomaly determination processing in the control device 20 with reference to FIG. 5.

FIG. 5 is a flowchart for describing the anomaly determination processing in the control device 20. The flow shown herein is executed each time the user configures settings of the sensor coordinate system Σs of the wireless acceleration sensor 101.

In Step S1, in accordance with a user input operation, the user input unit 252 sets, as coordinate system information, a vector (x, y, z) from the origin of the mechanical interface coordinate system Σm to the origin of the sensor coordinate system Σs of the wireless acceleration sensor 101 and rotation angles (w, p, r) that define the direction of the sensor coordinate system Σs through rotations around the axes of the mechanical interface coordinate system Σm, and stores the coordinate system information in the sensor coordinate storage unit 201. The user input unit 252 also sets, as setting information, the communication address of the wireless acceleration sensor 101 in accordance with a user input operation, and stores the setting information in the sensor setting storage unit 202.

In Step S2, the wireless acceleration sensor 101 starts measuring the acceleration in each axis of the sensor coordinate system Σs at the start of the learning control, and the sensor data reception unit 205 receives a sensor signal containing the measured acceleration in each axis of the sensor coordinate system Σs via the wireless receiver 30, and thus obtains the received acceleration in each axis of the sensor coordinate system Σs as sensor data.

In Step S3, the sensor value estimation unit 204 estimates sensor values with respect to each axis of the sensor coordinate system Σs at the mounting position of the wireless acceleration sensor 101 by performing a forward transformation to calculate the pose of the robot 10 using the angles of the respective joint axes 11(1) to 11(6) detected by the axis angle detection unit 203 before the robot 10 starts moving (when the robot 10 is stationary) and performing a coordinate transformation of the sensor coordinate system Σs.

Preferably, in Step S3, the sensor value estimation unit 204 estimates the sensor values (gravitational acceleration) before the robot 10 starts moving (when the robot 10 is stationary), regardless of whether or not the motion program is executed.

In Step S4, the sensor value anomaly determination unit 206 determines whether or not differences between the values of the sensor data obtained in Step S2 and the sensor values estimated in Step S3 in all the axes of the sensor coordinate system Σs are equal to or less than the threshold. If the differences between the values of the sensor data and the estimated sensor values in all the axes of the sensor coordinate system Σs are equal to or less than the threshold, the processing continues to Step S6. If any of the differences between the values of the sensor data and the estimated sensor values in all the axes of the sensor coordinate system Σs is not equal to or less than the threshold, the processing continues to Step S5.

In Step S5, the sensor value anomaly determination unit 206 outputs the result of the sensor data anomaly determination to the user notification unit 251, and the user notification unit 251 displays an alert on the display unit (not shown) of the teach pendant 25. The processing then returns to Step S1.

In Step S6, the sensor value estimation unit 204 estimates sensor values with respect to each axis of the sensor coordinate system Σs at the mounting position of the wireless acceleration sensor 101 by performing a forward transformation to calculate the position and the pose of the robot 10 using the angles of the respective joint axes 11(1) to 11(6) detected by the axis angle detection unit 203 when the robot 10 is in motion and performing a coordinate transformation of the sensor coordinate system Σs.

The motion of the robot 10 may be a motion in actual work, or a predetermined specific motion such as a translational motion with respect to the X axis or the Y axis of the robot coordinate system Σr.

In Step S7, the sensor value anomaly determination unit 206 determines whether or not differences between the values of the sensor data obtained by the sensor data reception unit 205 and the sensor values estimated in Step S6 in all the axes of the sensor coordinate system Σs are equal to or less than the threshold. If the differences between the values of the sensor data and the estimated sensor values in all the axes of the sensor coordinate system Σs are equal to or less than the threshold, the processing continues to Step S8. If any of the differences between the values of the sensor data and the estimated sensor values in all the axes of the sensor coordinate system Σs is not equal to or less than the threshold, the processing continues to Step S5.

In Step S8, if there is no anomaly in the sensor values, the control device 20 (sensor value anomaly determination unit 206) determines that the values of the sensor data are normal and proceeds with controlling the robot 10 using the motion program based on the learning control.

As described above, the control device 20 according to the first embodiment can prevent the robot from operating with a connection to an incorrect wireless acceleration sensor 101, by having the setting of the communication address of the wireless acceleration sensor 101 changed.

The control device 20 detects an anomaly in the sensor data through comparison between the values of the sensor data and the estimated sensor values before the robot 10 starts moving and while the robot 10 is in motion, and notifies the user of an alert indicating the detected anomaly. This configuration helps reduce extra workload required to prevent the control device 20 from proceeding with controlling the robot 10 with the incorrect setting of the wireless acceleration sensor 101, and helps prevent unexpected control of the robot 10 (e.g., motion that causes vibration to spread) due to the incorrect setting of the wireless acceleration sensor 101.

The first embodiment has been described above.

Second Embodiment

Next, a second embodiment will be described. In the first embodiment, the control device 20 estimates sensor values with respect to each axis of the sensor coordinate system Σs at the position of the wireless acceleration sensor 101 by performing a forward transformation to calculate the position and the pose of the robot 10 using the angles of the respective joint axes 11(1) to 11(6) of the robot 10 and performing a coordinate transformation of the sensor coordinate system Σs. The control device 20 then determines whether or not the differences between the values of the sensor data detected by the wireless acceleration sensor 101 and the estimated sensor values in all the axes of the sensor coordinate system Σs are equal to or less than the threshold, and notifies the user of an anomaly in the sensor data (connection to an incorrect wireless acceleration sensor 101). By contrast, in the second embodiment, a control device 20A estimates, as a physical quantity, a movement vector including a movement distance and a movement direction of a wireless acceleration sensor 101 in a robot coordinate system Σr by performing a forward transformation to calculate the position and the pose of a robot 10 using the angles of respective joint axes 11(1) to 11(6) of the robot 10 and performing a coordinate transformation of a sensor coordinate system Σs. The control device 20A also calculates, as a physical quantity, a movement vector including a movement distance and a movement direction of the wireless acceleration sensor 101 in the robot coordinate system Σr from sensor data received by a sensor data reception unit. The control device 20A then determines whether or not all components of differences between the movement vector calculated as the physical quantity from the sensor data and the movement vector estimated as the physical quantity are equal to or less than a threshold. The second embodiment differs from the first embodiment in the above-mentioned points.

This configuration enables the control device 20A according to the second embodiment to prevent the robot from operating with an incorrect sensor connection.

The following describes the second embodiment.

Figure 6:
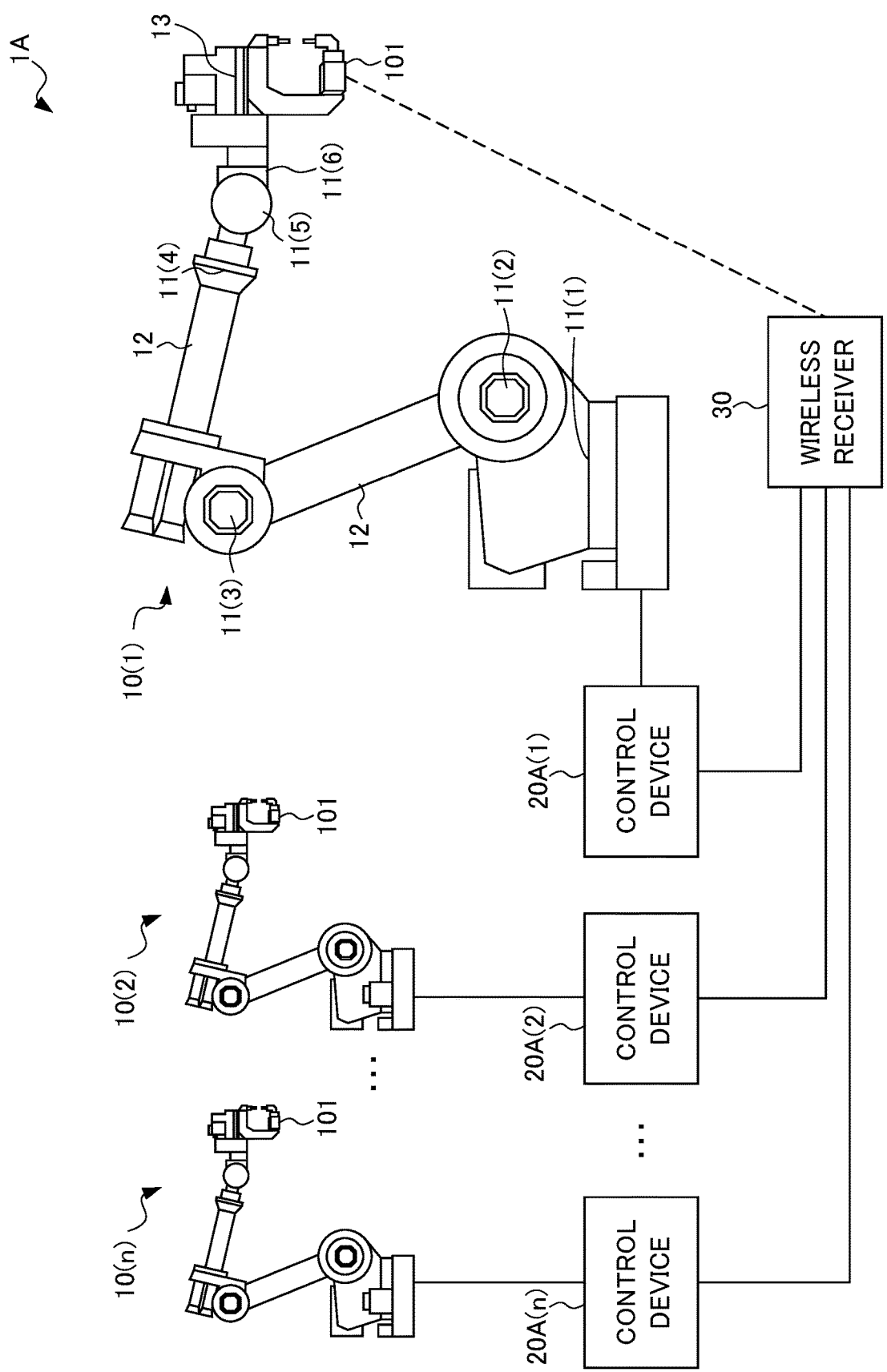
FIG. 6 is a functional block diagram illustrating an example of a functional configuration of a robot system according to a second embodiment.

FIG. 6 is a functional block diagram illustrating an example of a functional configuration of a robot system according to the second embodiment. It should be noted that elements having the same functions as their corresponding elements of the robot system 1 in FIG. 1 are denoted by the same reference numerals, and detailed description of such elements will be omitted.

As illustrated in FIG. 6, a robot system 1A includes n robots 10(1) to 10(n), n control devices 20A(1) to 20A(n), and a wireless receiver 30.

Hereinafter, the control devices 20A(1) to 20A(n) may also be collectively referred to as "control device 20A", provided that the control devices 20A(1) to 20A(n) do not need to be distinguished from one another.

The robots 10, the wireless acceleration sensors 101, and the wireless receiver 30 have the same configurations as the robots 10, the wireless acceleration sensors 101, and the wireless receiver 30 of the first embodiment.

<Control Device 20A>

Figure 7:
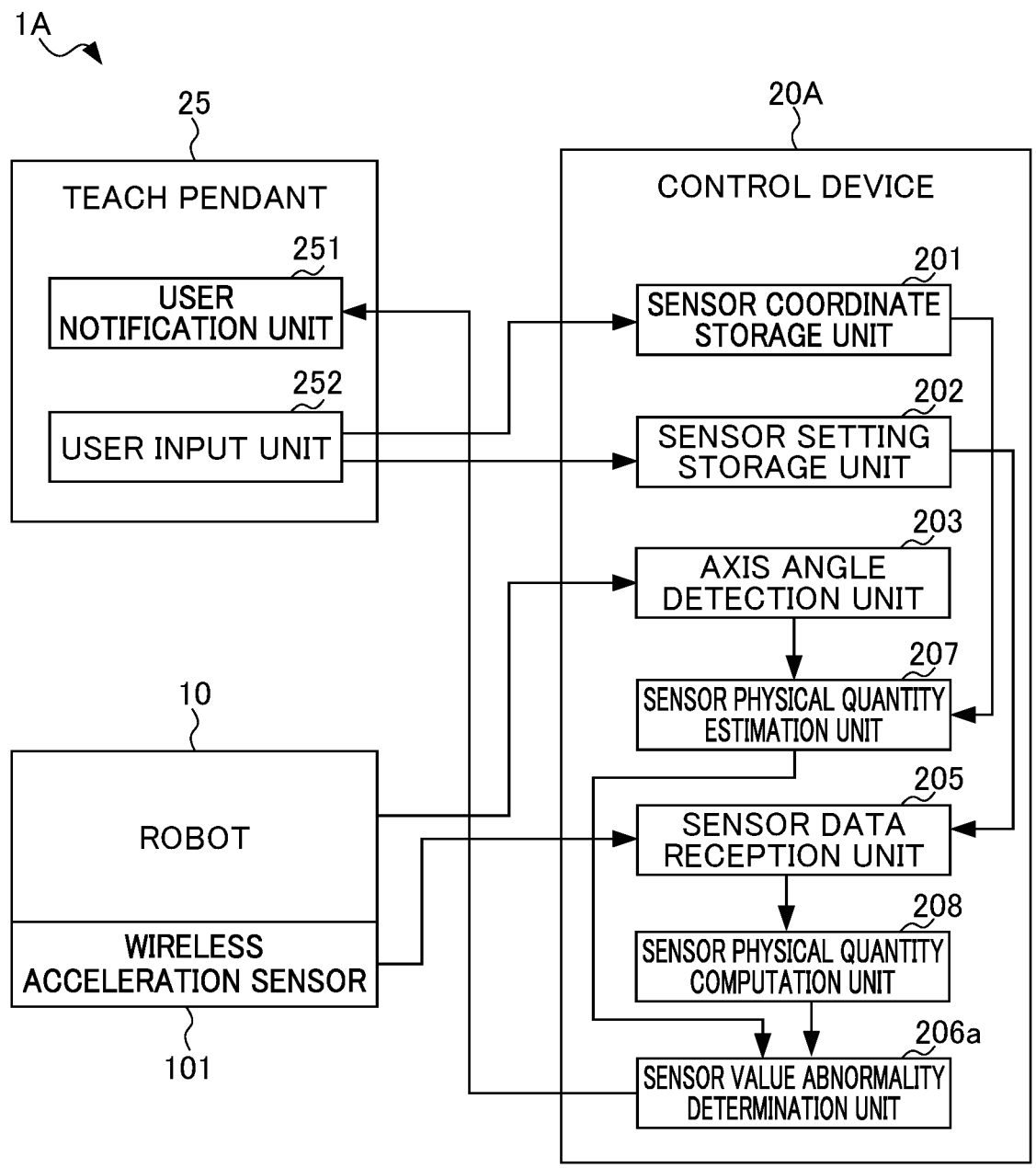
FIG. 7 is a functional block diagram illustrating an example of a functional configuration of a control device.

FIG. 7 is a functional block diagram illustrating an example of a functional configuration of the control device 20A.

As illustrated in FIG. 7, the control device 20A is connected to a teach pendant 25, and includes a sensor coordinate storage unit 201, a sensor setting storage unit 202, an axis angle detection unit 203, a sensor data reception unit 205, a sensor value anomaly determination unit 206a, a sensor physical quantity estimation unit 207, and a sensor physical quantity computation unit 208. The teach pendant 25 includes a user notification unit 251 and a user input unit 252.

The sensor coordinate storage unit 201, the sensor setting storage unit 202, the axis angle detection unit 203, and the sensor data reception unit 205 respectively have the same functions as the sensor coordinate storage unit 201, the sensor setting storage unit 202, the axis angle detection unit 203, and the sensor data reception unit 205 of the first embodiment.

Furthermore, the user notification unit 251 and the user input unit 252 respectively have the same functions as the user notification unit 251 and the user input unit 252 of the first embodiment.

The sensor physical quantity estimation unit 207 estimates a physical quantity related to the wireless acceleration sensor 101 through a forward transformation using the angles of the respective joint axes 11(1) to 11(6) detected by the axis angle detection unit 203 and a coordinate transformation of the sensor coordinate system Σs.

Specifically, for example, the sensor physical quantity estimation unit 207 calculates the position and the pose of the mechanical interface coordinate system Σm in the robot coordinate system Σr by performing a forward transformation using the angles of the respective joint axes 11(1) to 11(6) detected by the axis angle detection unit 203. The sensor physical quantity estimation unit 207 uses the vector (x, y, z) and the rotation angles (w, p, r) stored in the sensor coordinate storage unit 201 to estimate, as a physical quantity, the movement vector including the movement distance and the movement direction of the mounting position of the wireless acceleration sensor 101 in the robot coordinate system Σr.

The sensor physical quantity computation unit 208 calculates a physical quantity from sensor data of acceleration detected by the wireless acceleration sensor 101.

Specifically, the sensor physical quantity computation unit 208 calculates, as a physical quantity, the movement vector of the wireless acceleration sensor 101 in the robot coordinate system Σr by performing a second integration of time-series data, which is the sensor data of acceleration received from the sensor data reception unit 205, with respect to time.

The sensor value anomaly determination unit 206a compares the movement vector calculated as the physical quantity by the sensor physical quantity computation unit 208 against the movement vector estimated as the physical quantity by the sensor physical quantity estimation unit 207. The sensor value anomaly determination unit 206a determines that the sensor data reception unit 205 is receiving sensor data from a wireless acceleration sensor 101 provided on another robot 10 if the largest difference component among X, Y, and Z components of differences between the calculated movement vector and the estimated movement vector is greater than a preset threshold (e.g., "1 mm"). The sensor value anomaly determination unit 206a then outputs the determination result to the user notification unit 251 of the teach pendant 25.

It should be noted that the sensor value anomaly determination unit 206a may calculate, for example, the difference between the magnitude of the movement vector calculated by the sensor physical quantity computation unit 208 and the magnitude of the movement vector estimated by the sensor physical quantity estimation unit 207, and compare the calculated difference against a threshold.

<Anomaly Determination Processing in Control Device 20A>

Figure 8:
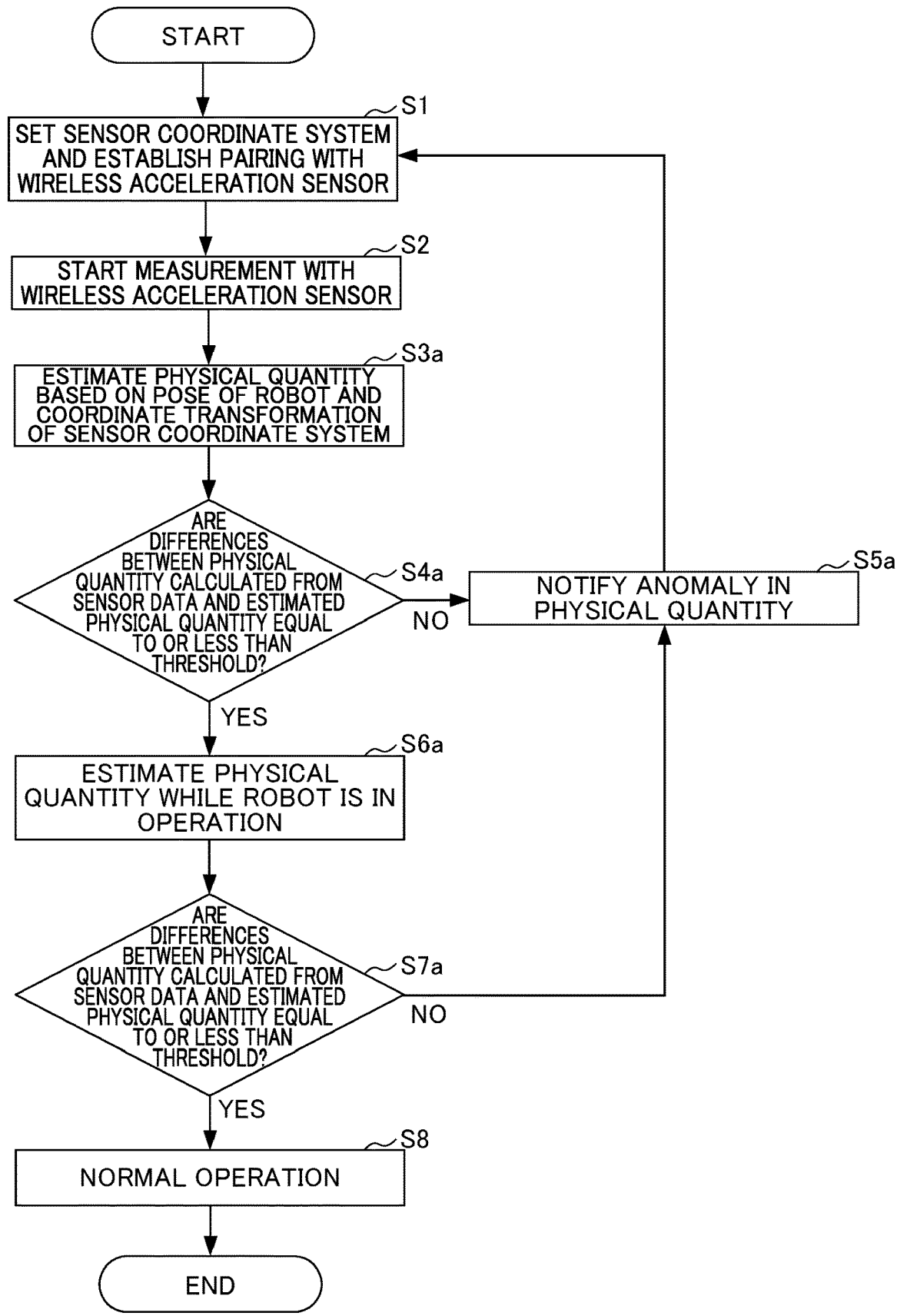
FIG. 8 is a flowchart for describing anomaly determination processing in the control device.

The following describes a flow of anomaly determination processing in the control device 20A with reference to FIG. 8.

FIG. 8 is a flowchart for describing the anomaly determination processing in the control device 20A. The flow shown herein is executed each time a user configures settings of the sensor coordinate system Σs of the wireless acceleration sensor 101.

It should be noted that processes in Steps S1, S2, and S8 in the anomaly determination processing shown in FIG. 8 are the same as those in Steps S1, S2, and S8 of the first embodiment shown in FIG. 5, and description thereof is omitted.

In Step S3a, the sensor physical quantity estimation unit 207 estimates, as a physical quantity, the movement vector of the mounting position of the wireless acceleration sensor 101 by performing a forward transformation to calculate the pose of the robot 10 using the angles of the respective joint axes 11(1) to 11(6) detected by the axis angle detection unit 203 before the robot 10 starts moving (when the robot 10 is stationary) and performing a coordinate transformation of the sensor coordinate system Σs.

In Step S4*a*, the sensor value anomaly determination unit 206*a* determines whether or not all difference components of differences between the movement vector of the position of the wireless acceleration sensor 101 calculated as the physical quantity by the sensor physical quantity computation unit 208 using the sensor data obtained in Step S2 and the physical quantity estimated in Step S3*a* are equal to or less than the threshold. If all the difference components are equal to or less than the threshold, the processing continues to Step S6*a*. If not all the difference components are equal to or less than the threshold, the processing continues to Step S5*a*.

In Step S5*a*, the sensor value anomaly determination unit 206*a* outputs the result of the physical quantity anomaly determination to the user notification unit 251, and the user notification unit 251 displays an alert on a display unit (not shown) of the teach pendant 25. The processing then returns to Step S1.

In Step S6*a*, the sensor physical quantity estimation unit 207 estimates, as a physical quantity, the movement vector of the mounting position of the wireless acceleration sensor 101 by performing a forward transformation to calculate the position and the pose of the robot 10 using the angles of the respective joint axes 11(1) to 11(6) detected by the axis angle detection unit 203 when the robot 10 is in motion and performing a coordinate transformation of the sensor coordinate system Σs.

In Step S7*a*, the sensor value anomaly determination unit 206*a* determines whether or not all difference components of the differences between the movement vector calculated as the physical quantity by the sensor physical quantity computation unit 208 and the movement vector estimated as the physical quantity in Step S6*a* are equal to or less than the threshold. If all the difference components are equal to or less than the threshold, the processing continues to Step S8. If not all the difference components are equal to or less than the threshold, the processing continues to Step S5*a*.

As described above, the control device 20A according to the second embodiment can prevent the robot 10 from operating with a connection to an incorrect wireless acceleration sensor 101, by having the setting of the communication address of the wireless acceleration sensor 101 changed.

The control device 20A detects an anomaly in the sensor data through comparison between the physical quantity calculated from the sensor data and the estimated physical quantity before the robot 10 starts moving and while the robot 10 is in motion, and notifies the user of an alert indicating the detected anomaly. This configuration helps reduce extra workload required to prevent the control device 20A from proceeding with controlling the robot 10 with the incorrect setting of the wireless acceleration sensor 101, and helps prevent unexpected control of the robot 10 (e.g., motion that causes vibration to spread) due to the incorrect setting of the wireless acceleration sensor 101.

The second embodiment has been described above.

Third Embodiment

Next, a third embodiment will be described. It should be noted that a control device 20B according to the third embodiment differs from that according to the first embodiment in the following points.

(1) The control device 20B according to the third embodiment receives sensor data detected by wireless acceleration sensors 101 respectively provided on a plurality of robots 10 including the robot 10 to be controlled.

(2) The control device 20B according to the third embodiment compares, for each of the wireless acceleration sensors 101 of the respective robots 10, the values of the sensor data from the wireless acceleration sensor 101 against sensor values at the position of the wireless acceleration sensor 101 that have been estimated through a forward transformation using the angles of respective axes of the robot 10 to be controlled and a coordinate transformation of a sensor coordinate system. The control device 20B then determines that the sensor is provided on a robot 10 other than the robot 10 to be controlled if any of differences between the values of the sensor data and the estimated values is greater than a preset threshold.

This configuration enables the control device 20B according to the third embodiment to prevent the robot from operating with an incorrect sensor connection.

The following describes the third embodiment.

Figure 9:
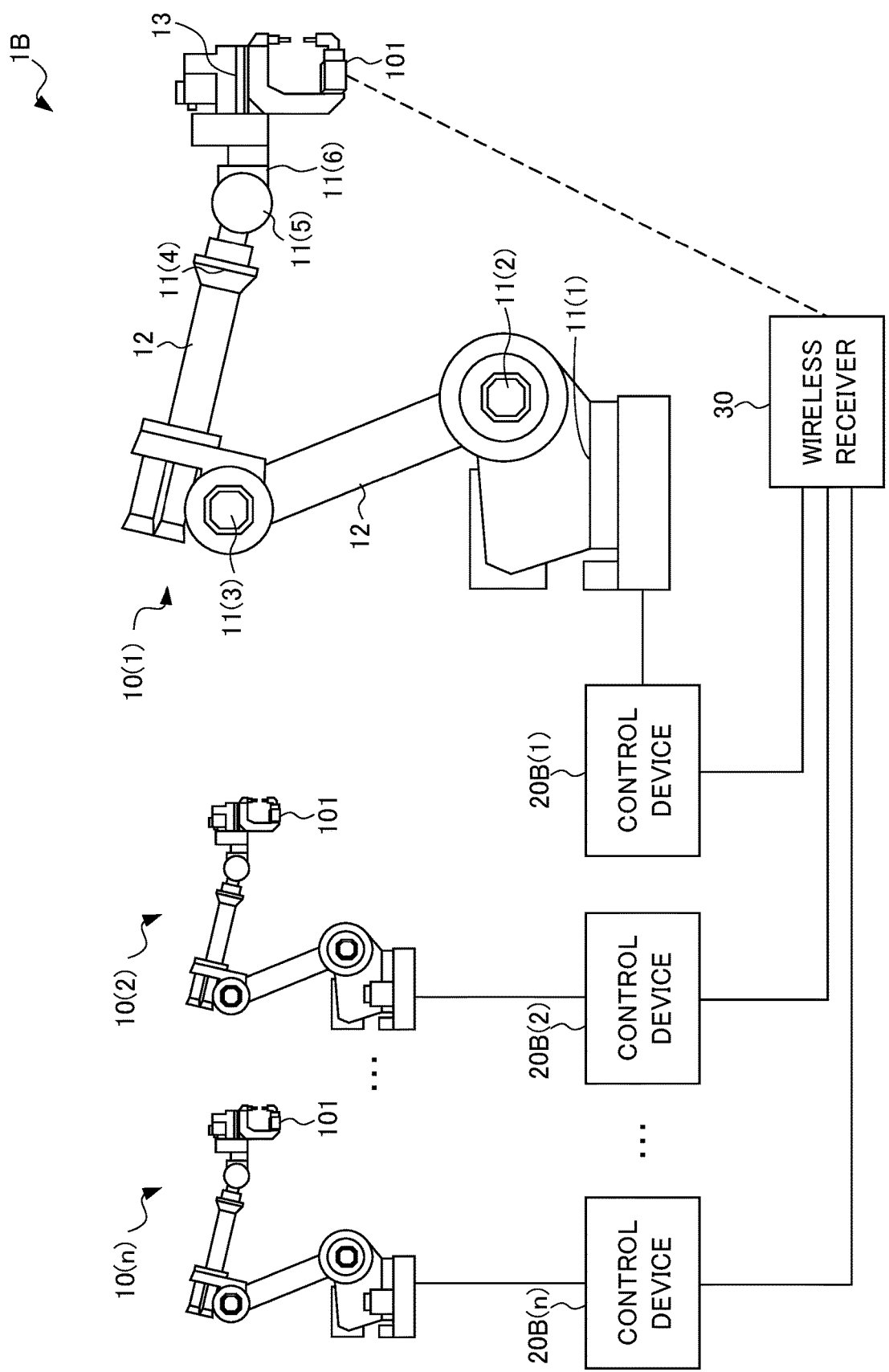
FIG. 9 is a functional block diagram illustrating an example of a functional configuration of a robot system according to a third embodiment.

FIG. 9 is a functional block diagram illustrating an example of a functional configuration of a robot system according to the third embodiment. It should be noted that elements having the same functions as their corresponding elements of the robot system 1 in FIG. 1 are denoted by the same reference numerals, and detailed description of such elements will be omitted.

As illustrated in FIG. 9, a robot system 1B includes n robots 10(1) to 10(*n*), n control devices 20B(1) to 20B(n), and a wireless receiver 30.

Hereinafter, the control devices 20B(1) to 20B(n) may also be collectively referred to as "control device 20B", provided that the control devices 20B(1) to 20B(n) do not need to be distinguished from one another.

The robots 10, the wireless acceleration sensors 101, and the wireless receiver 30 have the same configurations as the robots 10, the wireless acceleration sensors 101, and the wireless receiver 30 of the first embodiment.

<Control Device 20B>

Figure 10:
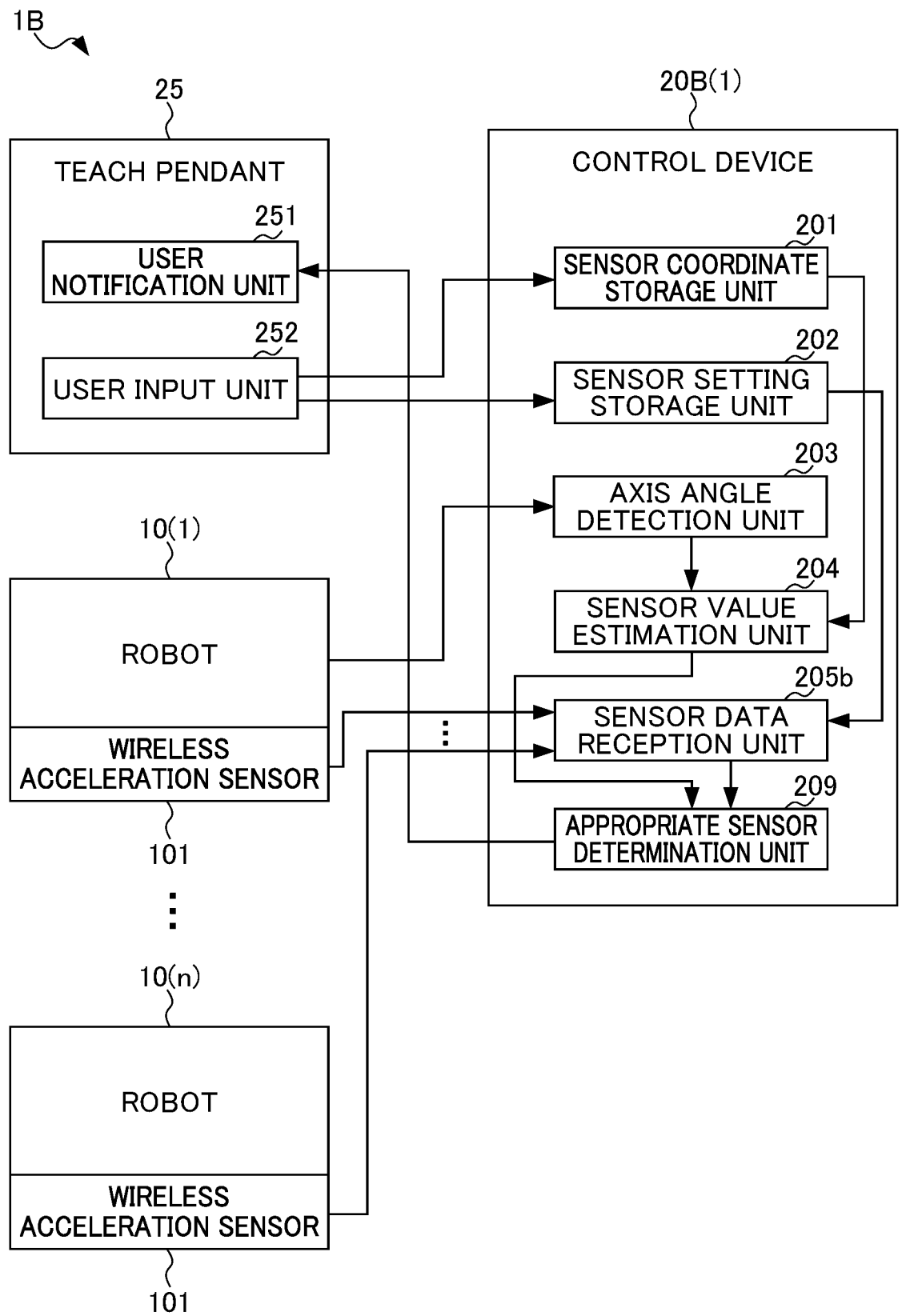
FIG. 10 is a functional block diagram illustrating an example of a functional configuration of a control device.

FIG. 10 is a functional block diagram illustrating an example of a functional configuration of the control device 20B(1). While FIG. 10 shows an example of the functional configuration of the control device 20B(1), the control devices 20B(2) to 20B(n) have the same functional configuration as the control device 20B(1).

As illustrated in FIG. 10, the control device 20B(1) is connected to a teach pendant 25, and includes a sensor coordinate storage unit 201, a sensor setting storage unit 202, an axis angle detection unit 203, a sensor value estimation unit 204, a sensor data reception unit 205*b*, and an appropriate sensor determination unit 209. The teach pendant 25 includes a user notification unit 251 and a user input unit 252.

The sensor coordinate storage unit 201, the sensor setting storage unit 202, the axis angle detection unit 203, and the sensor value estimation unit 204 respectively have the same functions as the sensor coordinate storage unit 201, the sensor setting storage unit 202, the axis angle detection unit 203, and the sensor value estimation unit 204 of the first embodiment.

Furthermore, the user notification unit 251 and the user input unit 252 respectively have the same functions as the user notification unit 251 and the user input unit 252 of the first embodiment.

The sensor data reception unit 205*b* receives sensor signals containing acceleration detected by the wireless acceleration sensors 101 respectively provided on the robots 10(2) to 10(n), as well as a sensor signal containing acceleration detected by the wireless acceleration sensor 101 provided on the robot 10(1) to be controlled. That is, for example, the wireless acceleration sensors 101 provided on the respective robots 10 may transmit sensor signals via multicast. In this case, the sensor data reception unit 205b does not need to refer to setting information in the sensor setting storage unit 202.

The sensor data reception unit 205b outputs, as sensor data, the acceleration in each axis of the sensor coordinate system Σs contained in the sensor signals received from the wireless acceleration sensors 101, to the appropriate sensor determination unit 209. It should be noted that the sensor data reception unit 205b may remove noise using a low-pass filter (not shown) before outputting the sensor data received from the wireless acceleration sensors 101 to the appropriate sensor determination unit 209.

The appropriate sensor determination unit 209 compares, with respect to each axis of the sensor coordinate system Σs, the values of the sensor data received from the wireless acceleration sensors 101 of the respective robots 10(1) to 10(n) and outputted from the sensor data reception unit 205 against the sensor values estimated by the sensor value estimation unit 204. The appropriate sensor determination unit 209 obtains, for each of the wireless acceleration sensors 101 of the respective robots 10(1) to 10(n), the largest difference among differences with respect to each axis between the values of the sensor data from the wireless acceleration sensor 101 and the estimated sensor values, and determines that the wireless acceleration sensor 101 is an inappropriate sensor that is provided on a robot 10 other than the robot 10(1) to be controlled if the largest difference based on the sensor data is greater than a preset threshold (e.g., "2 $m/s^2$").

On the other hand, the appropriate sensor determination unit 209 determines that the wireless acceleration sensor 101 is an appropriate sensor that is provided on the robot 10(1) to be controlled if the largest difference based on the sensor data is equal to or less than the preset threshold (e.g., "2 $m/s^2$"). The appropriate sensor determination unit 209 outputs the determination result to the user notification unit 251 of the teach pendant 25. In this case, the user input unit 252 may set the communication address of the appropriate wireless acceleration sensor 101 as setting information and store this setting information in the sensor setting storage unit 202 in accordance with a user input operation based on the result displayed on the user notification unit 251.

Figure 11:
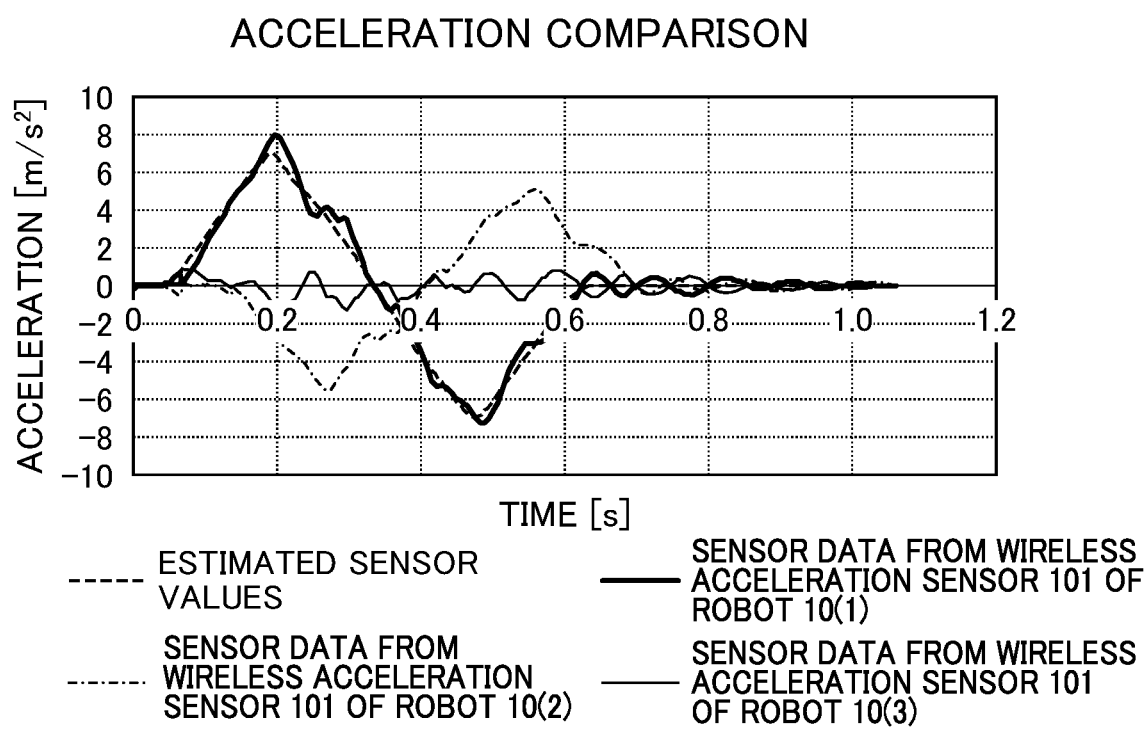
FIG. 11 is a diagram showing an example of comparison between values of sensor data and estimated sensor values.

FIG. 11 is a diagram showing an example of comparison between values of sensor data and estimated sensor values. FIG. 11 shows, as an example, values of sensor data with respect to the X-axis direction of the sensor coordinate system Σs detected by the wireless acceleration sensors 101 provided on the respective robots 10(1) to 10(3) when the robots were in motion and estimated sensor values.

It should be noted that the appropriate sensor determination unit 209 is not limited to being configured to calculate the differences between the values of the sensor data and the estimated sensor values with respect to each axis of the sensor coordinate system Σs, and compare the calculated differences against a preset threshold. For example, the appropriate sensor determination unit 209 may calculate differences between the magnitude of a vector that is a value of sensor data with respect to each axis of the sensor coordinate system Σs and the magnitude of a vector that is a sensor value estimated with respect to each axis of the sensor coordinate system Σs, and compare the calculated differences against a threshold.

Alternatively, using a predetermined function that uses the acceleration in each axis of the sensor coordinate system Σs as a variable, the appropriate sensor determination unit 209 may calculate differences between values calculated by inputting the values of sensor data of each axis of the sensor coordinate system Σs to the predetermined function and values calculated by inputting the sensor values estimated with respect to each axis of the sensor coordinate system Σs to the predetermined function, and compare the calculated differences against a threshold.

<Appropriate Sensor Determination Processing in Control Device 20B>

Figure 12:
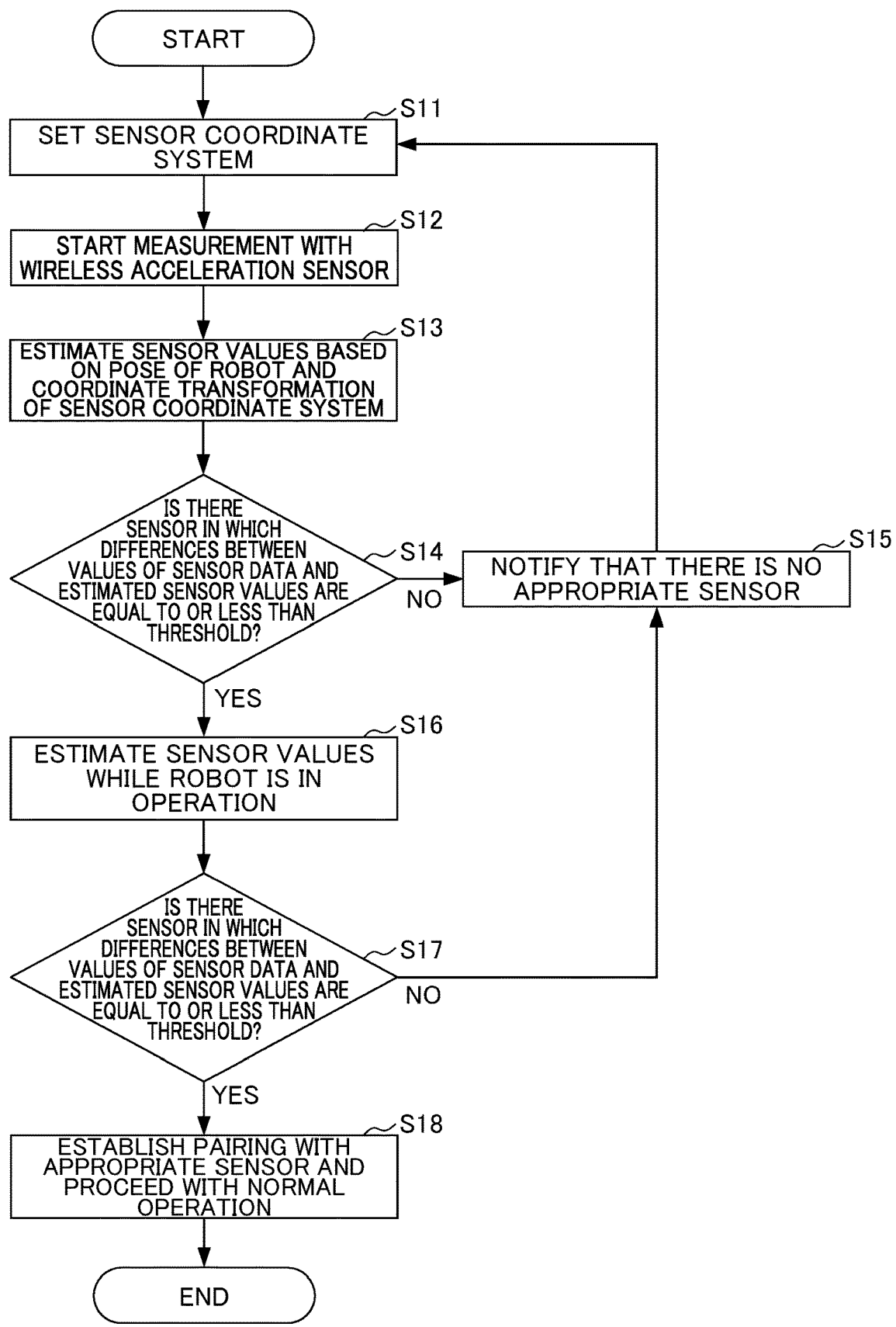
FIG. 12 is a flowchart for describing appropriate sensor determination processing in the control device.

The following describes a flow of appropriate sensor determination processing in the control device 20B with reference to FIG. 12. While the following description pertains to the appropriate sensor determination processing in the control device 20B(1), the control devices 20B(2) to 20B(n) perform the same processing as the control device 20B(1), and thus description thereof will be omitted.

FIG. 12 is a flowchart for describing the appropriate sensor determination processing in the control device 20B. The flow shown herein is executed each time a user configures settings of the sensor coordinate system Σs of the wireless acceleration sensor 101.

In Step S11, in accordance with a user input operation, the user input unit 252 sets, as coordinate system information, a vector (x, y, z) from the origin of the mechanical interface coordinate system Σm to the origin of the sensor coordinate system Σs of the wireless acceleration sensor 101 and rotation angles (w, p, r) that define the direction of the sensor coordinate system Σs through rotations around the axes of the mechanical interface coordinate system Σm, and stores the coordinate system information in the sensor coordinate storage unit 201.

In Step S12, each of the wireless acceleration sensors 101 of the respective robots 10(1) to 10(n) starts measuring the acceleration in each axis of the sensor coordinate system Σs at the start of the learning control, and the sensor data reception unit 205b receives, via the wireless receiver 30, a sensor signal containing the acceleration in each axis of the sensor coordinate system Σs measured by each of the wireless acceleration sensors 101 of the respective robots 10 including the robot 10(1) to be controlled, and thus obtains the acceleration in each axis of the sensor coordinate system Σs included in each of the received sensor signals as sensor data.

In Step S13, as in Step S3 in the first embodiment, the sensor value estimation unit 204 estimates sensor values with respect to each axis of the sensor coordinate system Σs at the mounting position of the wireless acceleration sensor 101 by performing a forward transformation to calculate the pose of the robot 10(1) using the angles of the respective joint axes 11(1) to 11(6) detected by the axis angle detection unit 203 before the robot 10(1) starts moving (when the robot 10 is stationary) and performing a coordinate transformation of the sensor coordinate system Σs.

Preferably, in Step S13, the sensor value estimation unit 204 estimates the sensor values (gravitational acceleration) before the robot 10(1) starts moving (when the robot 10 is stationary), regardless of whether or not the motion program is executed.

In Step S14, the appropriate sensor determination unit 209 determines whether or not there is an appropriate wireless acceleration sensor 101, among the wireless acceleration sensors 101 of the respective robots 10, in which differences between the values of the sensor data obtained in Step S12 and the sensor values estimated in Step S13 in all the axes of the sensor coordinate system Σs are equal to or less than the threshold. If there is an appropriate wireless acceleration sensor 101, the processing continues to Step S16. If there is no appropriate wireless acceleration sensor 101, the processing continues to Step S15.

In Step S15, the appropriate sensor determination unit 209 outputs, to the user notification unit 251, the result of the determination that there is no appropriate wireless acceleration sensor 101, and the user notification unit 251 displays an alert on a display unit (not shown) of the teach pendant 25. The processing then returns to Step S11.

In Step S16, the sensor value estimation unit 204 estimates sensor values with respect to each axis of the sensor coordinate system Σs at the mounting position of the wireless acceleration sensor 101 by performing a forward transformation to calculate the position and the pose of the robot 10(1) using the angles of the respective joint axes 11(1) to 11(6) detected by the axis angle detection unit 203 when the robot 10 is in motion and performing a coordinate transformation of the sensor coordinate system Σs.

The motion of the robot 10(1) may be a motion in actual work, or a predetermined specific motion such as a translational motion with respect to the X axis or the Y axis of the robot coordinate system Σr.

In Step S17, the appropriate sensor determination unit 209 determines whether or not there is an appropriate wireless acceleration sensor 101, among the wireless acceleration sensors 101 of the respective robots 10 including the robot 10(1) to be controlled, in which differences between the values of the sensor data obtained by the sensor data reception unit 205b and the sensor values estimated in Step S16 in all the axes of the sensor coordinate system Σs are equal to or less than the threshold. If there is an appropriate wireless acceleration sensor 101, the processing continues to Step S18. If there is no appropriate wireless acceleration sensor 101, the processing continues to Step S15.

In Step S18, in accordance with a user input operation, the user input unit 252 sets the communication address of the appropriate wireless acceleration sensor 101 as setting information, stores the setting information in the sensor setting storage unit 202, and establishes a pairing with the appropriate wireless acceleration sensor 101. The control device 20B(1) then proceeds with controlling the robot 10 using the motion program based on the learning control.

As described above, the control device 20B according to the third embodiment can prevent the robot from operating with a connection to an incorrect wireless acceleration sensor 101 and switch connection settings as desired, by establishing a pairing with an appropriate wireless acceleration sensor 101, among the wireless acceleration sensors 101 provided on the respective robots 10, in which differences between the values of the sensor data and the estimated sensor values in all the axes of the sensor coordinate system Σs are equal to or less than the threshold, that is, by establishing a pairing with the wireless acceleration sensor 101 provided on the robot 10 to be controlled.

The control device 20B determines whether or not there is an appropriate wireless acceleration sensor 101 by performing comparison between the values of the sensor data and the estimated sensor values for each of the wireless acceleration sensors 101 provided on the respective robots 10 before the robot 10 starts moving and while the robot 10 is in motion, and notifies the user of an alert if there is no appropriate wireless acceleration sensor 101. This configuration helps reduce extra workload required to prevent the control device 20B from proceeding with controlling the robot 10 with the setting of an inappropriate wireless acceleration sensor 101, and helps prevent unexpected control of the robot 10 (e.g., motion that causes vibration to spread) due to the incorrect setting of the wireless acceleration sensor 101.

The third embodiment has been described above.

Fourth Embodiment

Next, a fourth embodiment will be described. It should be noted that a control device 20B according to the fourth embodiment differs from that according to the first embodiment in the following points.

(1) The control device 20B according to the fourth embodiment receives sensor data detected by wireless acceleration sensors 101 respectively provided on a plurality of robots 10 including the robot 10 to be controlled.

(2) The control device 20B according to the fourth embodiment compares, for each of the wireless acceleration sensors 101 of the respective robots 10, a physical quantity calculated from sensor data from the wireless acceleration sensor 101 against a physical quantity estimated through a forward transformation using the angles of respective axes of the robot 10 to be controlled and a coordinate transformation of the sensor coordinate system. The control device 20B then determines that the sensor is provided on a robot 10 other than the robot 10 to be controlled if any of differences between the physical quantity calculated from the sensor data and the estimated physical quantity is greater than a preset threshold.

This configuration enables the control device 20B according to the fourth embodiment to prevent the robot from operating with an incorrect sensor connection.

The following describes the fourth embodiment.

A robot system according to the fourth embodiment is substantially the same as the robot system 1B in FIG. 9. Elements having the same functions as their corresponding elements of the robot system 1B are denoted by the same reference numerals, and detailed description of such elements will be omitted.

The robots 10, the wireless acceleration sensors 101, and the wireless receiver 30 have the same configurations as the robots 10, the wireless acceleration sensors 101, and the wireless receiver 30 of the third embodiment.

<Control Device 20B>

Figure 13:
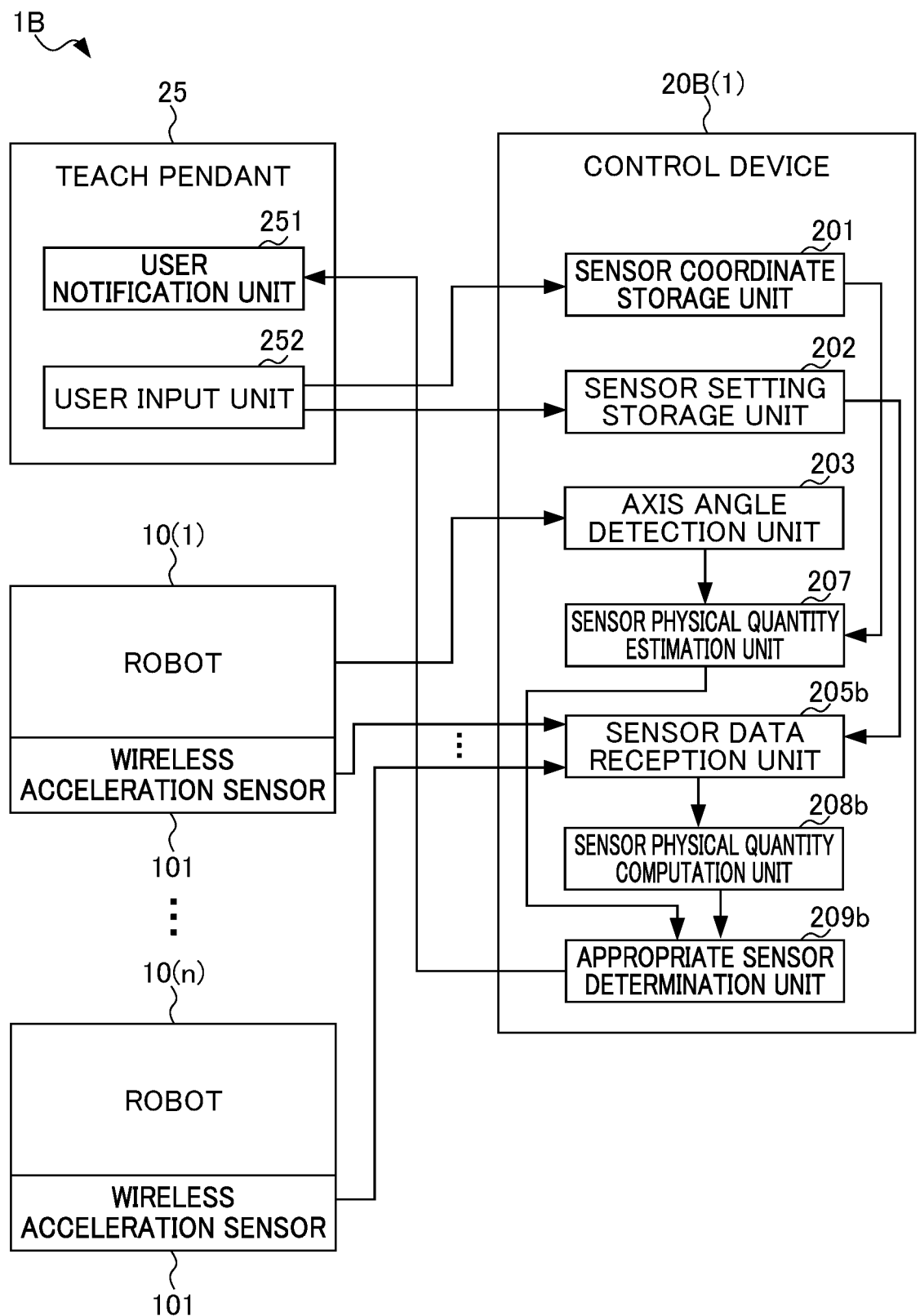
FIG. 13 is a functional block diagram illustrating an example of a functional configuration of a control device.

FIG. 13 is a functional block diagram illustrating an example of a functional configuration of the control device 20B(1). While FIG. 13 shows an example of the functional configuration of the control device 20B(1), the control devices 20B(2) to 20B(n) have the same functional configuration as the control device 20B(1).

As illustrated in FIG. 13, the control device 20B(1) is connected to a teach pendant 25, and includes a sensor coordinate storage unit 201, a sensor setting storage unit 202, an axis angle detection unit 203, a sensor data reception unit 205b, a sensor physical quantity estimation unit 207, a sensor physical quantity computation unit 208b, and an appropriate sensor determination unit 209b. The teach pendant 25 includes a user notification unit 251 and a user input unit 252.

The sensor coordinate storage unit 201, the sensor setting storage unit 202, and the axis angle detection unit 203 respectively have the same functions as the sensor coordinate storage unit 201, the sensor setting storage unit 202, and the axis angle detection unit 203 of the first embodiment.

The sensor physical quantity estimation unit 207 has the same function as the sensor physical quantity estimation unit 207 of the second embodiment.

The sensor data reception unit 205b has the same function as the sensor data reception unit 205b of the third embodiment.

Furthermore, the user notification unit 251 and the user input unit 252 respectively have the same functions as the user notification unit 251 and the user input unit 252 of the first embodiment.

The sensor physical quantity computation unit 208b calculates a physical quantity from sensor data of acceleration detected by each of the wireless acceleration sensors 101 provided on the respective robots 10 including the robot 10(1) to be controlled.

Specifically, the sensor physical quantity computation unit 208b calculates, as a physical quantity, a movement vector of each wireless acceleration sensor 101 in the robot coordinate system Σr by performing a second integration of time-series data of the wireless acceleration sensor 101, which is the sensor data of acceleration received from the sensor data reception unit 205b, with respect to time.

The appropriate sensor determination unit 209b compares the movement vector of each wireless acceleration sensor 101 calculated as the physical quantity by the sensor physical quantity computation unit 208b against a movement vector estimated as the physical quantity by the sensor physical quantity estimation unit 207. The appropriate sensor determination unit 209b determines, for each of the wireless acceleration sensors 101, that the wireless acceleration sensor 101 is an inappropriate sensor that is provided on a robot 10 other than the robot 10(1) to be controlled if the largest difference component among X, Y, and Z components of differences between the movement vector calculated from the sensor data and the estimated movement vector is greater than a preset threshold (e.g., "1 mm").

On the other hand, the appropriate sensor determination unit 209b determines that the wireless acceleration sensor 101 is an appropriate sensor that is provided on the robot 10(1) to be controlled if the largest difference component based on the sensor data is equal to or less than the preset threshold (e.g., "1 mm"). The appropriate sensor determination unit 209b outputs the determination result to the user notification unit 251 of the teach pendant 25. In this case, the user input unit 252 may set the communication address of the appropriate wireless acceleration sensor 101 as setting information and store this setting information in the sensor setting storage unit 202 in accordance with a user input operation based on the result displayed on the user notification unit 251.

<Appropriate Sensor Determination Processing in Control Device 20B>

Figure 14:
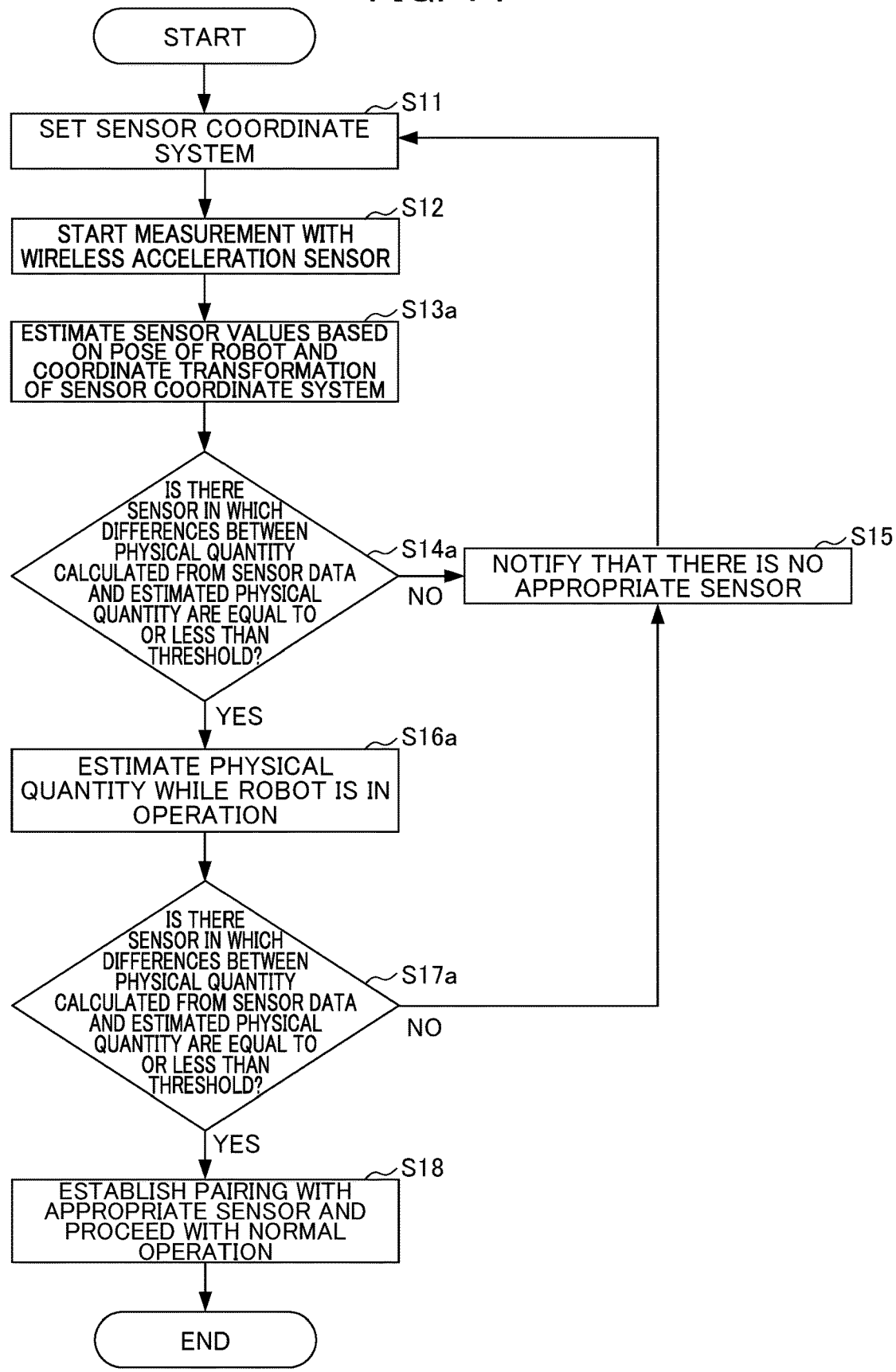
FIG. 14 is a flowchart for describing appropriate sensor determination processing in the control device.

The following describes a flow of appropriate sensor determination processing in the control device 20B with reference to FIG. 14. While the following description pertains to the appropriate sensor determination processing in the control device 20B(1), the control devices 20B(2) to 20B(n) perform the same processing as the control device 20B(1), and thus description thereof will be omitted.

FIG. 14 is a flowchart for describing the appropriate sensor determination processing in the control device 20B. The flow shown herein is executed each time a user configures settings of the sensor coordinate system Σs of the wireless acceleration sensor 101.

It should be noted that processes in Steps S11, S12, S15, and S18 in the appropriate sensor determination processing shown in FIG. 14 are the same as those in Steps S11, S12, S15, and S18 of the third embodiment shown in FIG. 12, and description thereof is omitted.

In Step S13a, the sensor physical quantity estimation unit 207 estimates, as a physical quantity, the movement vector of the mounting position of the wireless acceleration sensor 101 by performing a forward transformation to calculate the pose of the robot 10(1) using the angles of the respective joint axes 11(1) to 11(6) detected by the axis angle detection unit 203 before the robot 10(1) starts moving (when the robot 10(1) is stationary) and performing a coordinate transformation of the sensor coordinate system Σs.

In Step S14a, the appropriate sensor determination unit 209b determines whether or not there is an appropriate acceleration sensor 101, among the wireless acceleration sensors 101 of the respective robots 10 including the robot 10(1) to be controlled, in which all difference components of differences between the movement vector of the position of the wireless acceleration sensor 101 calculated as the physical quantity by the sensor physical quantity computation unit 208b using the sensor data obtained in Step S12 and the physical quantity estimated in Step S13a are equal to or less than the threshold. If there is an appropriate wireless acceleration sensor 101, the processing continues to Step S16a. If there is no appropriate wireless acceleration sensor 101, the processing continues to Step S15.

In Step S16a, the sensor physical quantity estimation unit 207 estimates, as a physical quantity, the movement vector of the mounting position of the wireless acceleration sensor 101 by performing a forward transformation to calculate the position and the pose of the robot 10(1) using the angles of the respective joint axes 11(1) to 11(6) detected by the axis angle detection unit 203 when the robot 10(1) is in motion and performing a coordinate transformation of the sensor coordinate system Σs.

In Step S17a, the appropriate sensor determination unit 209b determines whether or not there is an appropriate wireless acceleration sensor 101 in which all difference components of the differences between the movement vector calculated as the physical quantity on a per-wireless acceleration sensor 101 basis by the sensor physical quantity computation unit 208b and the movement vector estimated as the physical quantity in Step S16a are equal to or less than the threshold. If there is an appropriate wireless acceleration sensor 101, the processing continues to Step S18. If there is no appropriate wireless acceleration sensor 101, the processing continues to Step S15.

As described above, the control device 20B according to the fourth embodiment can prevent the robot 10 from operating with a connection to an incorrect wireless acceleration sensor 101 and switch connection settings as desired, by establishing a pairing with an appropriate wireless acceleration sensor 101, among the wireless acceleration sensors 101 provided on the respective robots 10, in which all difference components of the differences between the physical quantity calculated using the sensor data and the estimated physical quantity are equal to or less than the threshold, that is, by establishing a pairing with the wireless acceleration sensor 101 provided on the robot 10 to be controlled.

The control device 20B determines whether or not there is an appropriate wireless acceleration sensor 101 through comparison between the physical quantity calculated using the sensor data from each of the wireless acceleration sensors 101 provided on the respective robots 10 and the estimated physical quantity before the robot 10 starts moving and while the robot 10 is in motion, and notifies the user of an alert if there is no appropriate wireless acceleration sensor 101.

This configuration helps reduce extra workload required to prevent the control device 20B from proceeding with controlling the robot 10 with the setting of an inappropriate wireless acceleration sensor 101, and helps prevent unexpected control of the robot 10 (e.g., motion that causes vibration to spread) due to the incorrect setting of the wireless acceleration sensor 101.

The fourth embodiment has been described above.

The first to fourth embodiments have been described above. The control device 20 (20A, 20B) is not limited to the embodiments described above, and encompasses changes such as modifications and improvements to the extent that the object of the present invention is achieved.

Modification Example 1

In the first to fourth embodiments described above, the sensor is the wireless acceleration sensor 101. However, the sensor is not limited as such. For example, a gyroscope sensor may be provided as the sensor on the robot 10. In this case, the gyroscope sensor detects angular velocity for sensor values. The control device 20 calculates the position and the pose of the mechanical interface coordinate system Σm in the robot coordinate system Σr through a forward transformation using the detected angles of the respective joint axes 11(1) to 11(6). Then, the control device 20 may estimate sensor values of angular velocity from change in the pose of the robot 10 or estimate, as a physical quantity, a movement distance and a movement direction (movement vector) of the position of the gyroscope sensor from change in the pose of the robot 10.

Alternatively, an inertial sensor may be provided as the sensor on the robot 10. In the case of the inertial sensor, the control device 20 can operate in the same manner as in the cases of the wireless acceleration sensor 101 and the gyroscope sensor described above.

Alternatively, a force sensor may be provided as the sensor on the robot 10. In this case, the control device 20 may, for example, perform a simulation to estimate, from internal data of the robot, a force vector including the magnitude and the direction of force to be detected by the force sensor as a physical quantity other than the movement vector.

Alternatively, a laser tracker may be provided as the sensor on the robot 10. In this case, the laser tracker can directly measure motion paths. Accordingly, the control device 20 may estimate a motion path (position) through a forward transformation using the angles of the respective axes in the internal data of the robot and performing a coordinate transformation of the sensor coordinate system Σs.

Instead of the laser tracker, a motion capture sensor may be provided on the robot 10. In this case, the control device 20 can operate in the same manner as in the case of the laser tracker.

Alternatively, a vision sensor may be provided as the sensor on the robot 10. In the case of a motion of a tool attached to the robot 10 moving on a plane, for example, the vision sensor mounted on the tool continuously captures images of the plane, and the control device 20 can calculate a movement distance as a physical quantity from differences between the captured images. The control device 20 can also estimate the movement distance from internal data of the robot.

Alternatively, a combination of two or more sensors, such as a combination of the wireless acceleration sensor 101 and the gyroscope sensor described above, may be provided on the robot 10. Alternatively, a smart device, such as a smartphone, that includes one or more sensors, such as the wireless acceleration sensor 101 and the gyroscope sensor, may be provided as the sensor on the robot 10.

Modification Example 2

For another example, in the robot systems 1 and 1A according to the first and second embodiments, each of the wireless acceleration sensors 101 provided on the respective robots 10 and the corresponding control device 20 or 20A communicate with each other via the wireless receiver 30. However, the robot systems 1 and 1A are not limited as such. For example, as shown in FIG. 15, each of the wireless acceleration sensors 101 in the robot system 1 and the corresponding control device 20 or 20A may communicate with each other using one of wireless receivers 31(1) to 31(*n*) that are provided in one-to-one correspondence with the robots 10 and that each receive only sensor signals from a wireless acceleration sensor 101 paired with the wireless receiver.

Figure 15:
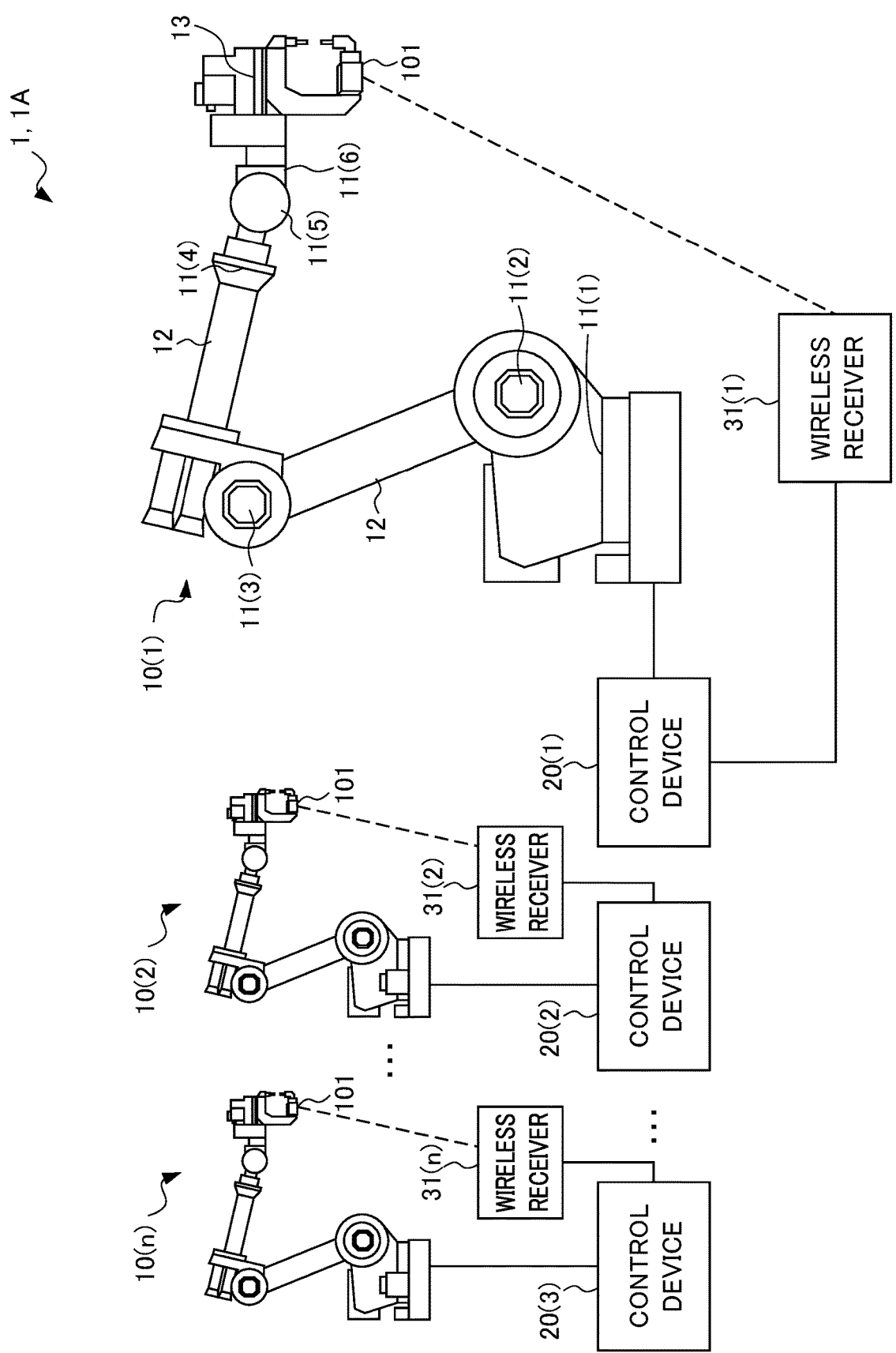
FIG. 15 is a functional block diagram illustrating an example of a functional configuration of a robot system.

FIG. 15 is a functional block diagram illustrating an example of a functional configuration of a robot system. It should be noted that elements having the same functions as their corresponding elements of the robot system 1 in FIG. 1 are denoted by the same reference numerals, and detailed description of such elements will be omitted.

As shown in FIG. 15, the wireless acceleration sensor 101 provided on a robot 10(*i*) is paired with the wireless receiver 31(*i*), forming a pair (i is from 1 to n). That is, in a situation in which the wireless acceleration sensor 101 provided on the robot 10(*i*) is relocated to another robot 10(*j*), the control device 20(*j*) needs to switch to a connection with the wireless receiver 31(*i*) (j≠i and j=1 to n).

In other words, since the pairing of each wireless acceleration sensor 101 and a wireless receiver 31 is performed on an individual basis, the user does not need to configure settings for the wireless acceleration sensor 101, i.e., the sensor setting storage unit 202 is not required, and the control device 20 or 20A can readily switch between pairs of robots 10 and wireless acceleration sensors 101 by simply changing connections with wireless receivers 31.

It should be noted that each of the functions included in the control devices 20, 20A, and 20B according to the first to fourth embodiments can be implemented by hardware, software, or a combination thereof. Being implemented by software herein means being implemented through a computer reading and executing a program.

The programs can be supplied to the computer by being stored on any of various types of non-transitory computer readable media. The non-transitory computer readable media include various types of tangible storage media. Examples of non-transitory computer readable media include magnetic storage media (such as flexible disks, magnetic tape, and hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the programs may be supplied to the computer using any of various types of transitory computer readable media. Examples of transitory computer readable media include electrical signals, optical signals, and electromagnetic waves. Such transitory computer readable media are able to supply the programs to the computer through a wireless communication channel or a wired communication channel such as electrical wires or optical fibers.

It should be noted that writing the programs to be recorded on a storage medium includes processes that are not necessarily performed chronologically and that may be performed in parallel or individually as well as processes that are performed chronologically according to the order thereof.

To put the foregoing into other words, the control device according to the present disclosure can take various embodiments having the following configurations.

(1) A control device 20 according to the present disclosure is a control device for controlling a robot 10 provided with a wireless acceleration sensor 101, the control device including: a sensor coordinate storage unit 201 configured to store coordinate system information related to a preset sensor coordinate system Σs of the wireless acceleration sensor 101; a sensor setting storage unit 202 configured to store setting information related to communication with the wireless acceleration sensor 101; a sensor data reception unit 205 configured to receive sensor data detected by the wireless acceleration sensor 101 based on the setting information; an axis angle detection unit 203 configured to detect an angle of each of a plurality of joint axes 11(1) to 11(6) included in the robot 10; a sensor value estimation unit 204 configured to estimate sensor values to be detected by the wireless acceleration sensor 101, through a forward transformation using the angles of the respective joint axes 11(1) to 11(6) detected by the axis angle detection unit 203 and a coordinate transformation of the sensor coordinate system Σs; and a sensor value anomaly determination unit 206 configured to compare values of the sensor data against the sensor values estimated by the sensor value estimation unit 204, and determine that the sensor data reception unit 205 is receiving sensor data from a wireless acceleration sensor 101 provided on another robot 10 if a difference between the values of the sensor data and the estimated sensor values is greater than a preset threshold.

This control device 20 can prevent the robot 10 from operating with a connection to an incorrect wireless acceleration sensor 101.

(2) A control device 20A according to the present disclosure is a control device for controlling a robot 10 provided with a wireless acceleration sensor 101, the control device including: a sensor coordinate storage unit 201 configured to store coordinate system information related to a preset sensor coordinate system Σs of the wireless acceleration sensor 101; a sensor setting storage unit 202 configured to store setting information related to communication with the wireless acceleration sensor 101; a sensor data reception unit 205 configured to receive sensor data detected by the wireless acceleration sensor 101 based on the setting information; a sensor physical quantity computation unit 208 configured to calculate a physical quantity from the sensor data; an axis angle detection unit 203 configured to detect an angle of each of a plurality of joint axes 11(1) to 11(6) included in the robot; a sensor physical quantity estimation unit 207 configured to estimate a physical quantity related to the wireless acceleration sensor 101 through a forward transformation using the angles of the respective joint axes 11(1) to 11(6) detected by the axis angle detection unit 203 and a coordinate transformation of the sensor coordinate system; and a sensor value anomaly determination unit 206a configured to compare the physical quantity calculated from the sensor data against the physical quantity estimated by the sensor physical quantity estimation unit 207, and determine that the sensor data reception unit 205 is receiving sensor data from a sensor provided on another robot if a difference between the calculated physical quantity and the estimated physical quantity is greater than a preset threshold.

This control device 20A can produce the same effects as the control device described in (1).

(3) The control device 20 or 20A described in (1) or (2) may further include a user notification unit 251 configured to output an alert if the sensor value anomaly determination unit 206 or 206a determines that the sensor data reception unit 205 is receiving sensor data from a wireless acceleration sensor 101 provided on another robot 10.

This configuration enables the control device 20 or 20A to notify a user of a connection with an incorrect wireless acceleration sensor 101.

(4) In the control device 20 or 20A described in (3), the user notification unit 251 may output, along with the alert, the setting information stored in the sensor setting storage unit 202 and the values of the sensor data received by the sensor data reception unit 205.

This configuration allows the user to check, for example, whether or not the setting information stored in the sensor setting storage unit 202 is incorrect and whether or not the wireless acceleration sensor 101 is experiencing a malfunction.

(5) In the control device 20 or 20A described in any one of (1) to (4), the robot may be provided with two or more sensors that respectively measure different physical quantities.

This configuration enables the control device 20 or 20A to detect an anomaly in sensor data with greater accuracy.

(6) In the control device 20 or 20A described in any one of (1) to (4), the robot 10 may be provided with, as the sensor, a smart device that includes one or more sensors.

This configuration enables the control device 20 or 20A to produce the same effects as the control device described in (5).

(7) A control device 20B according to the present disclosure is a control device for controlling a robot 10 among a plurality of robots 10 each provided with a wireless acceleration sensor 101, the control device including: a sensor coordinate storage unit 201 configured to store coordinate system information related to a preset sensor coordinate system Σs of the wireless acceleration sensor 101 provided on the robot 10 to be controlled; a sensor data reception unit 205b configured to receive sensor data detected by each of the wireless acceleration sensors 101 provided on the respective robots 10 including the robot 10 to be controlled; an axis angle detection unit 203 configured to detect an angle of each of joint axes 11(1) to 11(6) included in the robot 10 to be controlled; a sensor value estimation unit 204 configured to estimate sensor values to be detected by the wireless acceleration sensor 101 of the robot 10 to be controlled, through a forward transformation using the angles of the respective joint axes 11(1) to 11(6) detected by the axis angle detection unit 203 and a coordinate transformation of the sensor coordinate system Σs; and an appropriate sensor determination unit 209 configured to compare, for each of the wireless acceleration sensors 101 provided on the respective robots 10, values of the sensor data from the wireless acceleration sensor 101 against the sensor values estimated by the sensor value estimation unit 204, and determine that the wireless acceleration sensor 101 is provided on a robot 10 other than the robot 10 to be controlled if a difference between the sensor data and the estimated sensor values is greater than a preset threshold.

This control device 20B can produce the same effects as the control device described in (1).

(8) A control device 20B according to the present disclosure is a control device for controlling a robot 10 among a plurality of robots 10 each provided with a wireless acceleration sensor 101, the control device including: a sensor coordinate storage unit 201 configured to store coordinate system information related to a preset sensor coordinate system Σs of the wireless acceleration sensor 101 provided on the robot 10 to be controlled; a sensor data reception unit 205b configured to receive sensor data detected by each of the wireless acceleration sensors 101 provided on the respective robots 10 including the robot 10 to be controlled; a sensor physical quantity computation unit 208b configured to calculate a physical quantity from the sensor data from each of the wireless acceleration sensors 101 provided on the respective robots 10; an axis angle detection unit 203 configured to detect an angle of each of joint axes 11(1) to 11(6) included in the robot 10 to be controlled; a sensor physical quantity estimation unit 207 configured to estimate a physical quantity related to the wireless acceleration sensor 101 of the robot 10 to be controlled, through a forward transformation using the angles of the respective joint axes 11(1) to 11(6) detected by the axis angle detection unit 203 and a coordinate transformation of the sensor coordinate system Σs; and an appropriate sensor determination unit 209b configured to compare, for each of the wireless acceleration sensors 101 provided on the respective robots 10, the physical quantity calculated from the sensor data from the wireless acceleration sensor 101 against the physical quantity estimated by the sensor physical quantity estimation unit 207, and determine that the wireless acceleration sensor 101 is provided on a robot 10 other than the robot 10 to be controlled if a difference between the physical quantity calculated from the sensor data and the estimated physical quantity is greater than a preset threshold.

This control device 20B can produce the same effects as the control device described in (1).

EXPLANATION OF REFERENCE NUMERALS 1, 1A, 1B: Robot system
10(1) to 10(n): Robot
20, 20A, 20B: Control device
201: Sensor coordinate storage unit
202: Sensor setting storage unit
203: Axis angle detection unit
204: Sensor value estimation unit
205, 205b: Sensor data reception unit
206, 206a: Sensor value anomaly determination unit
207: Sensor physical quantity estimation unit
208, 208b: Sensor physical quantity computation unit
209, 209b: Appropriate sensor determination unit
30, 31(1) to 31(n): Wireless receiver
101: Wireless acceleration sensor

The invention claimed is:

1. A control device for controlling a robot provided with a sensor, the control device comprising:
a memory; and
a processor, wherein
the memory is configured to;
store coordinate system information related to a preset sensor coordinate system of the sensor; and
store setting information related to communication with the sensor, and
the processor is configured to;
receive sensor data detected by the sensor based on the setting information;
detect an angle of each of a plurality of axes included in the robot;
estimate sensor values to be detected by the sensor, through a forward transformation using the angles of the respective axes detected and a coordinate transformation of the sensor coordinate system; and
compare values of the sensor data against the sensor values estimated, and determine that the processor is receiving sensor data from a sensor provided on another robot if a difference between the values of the sensor data and the estimated sensor values is greater than a preset threshold,
wherein, the robot includes movable members connected by the plurality of axes and servomotors disposed in the respective axes, and the control device drives the movable members by driving each of the servomotors.

2. The control device according to claim 1, further comprising a display configured to output an alert if the processor determines that the processor is receiving sensor data from a sensor provided on another robot.

3. The control device according to claim 2, wherein the display outputs, along with the alert, the setting information stored in the memory and the values of the sensor data received by the processor.

4. The control device according to claim 1, wherein the robot is provided with two or more sensors that respectively measure different physical quantities.

5. The control device according to claim 1, wherein the robot is provided with, as the sensor, a smart device that includes one or more sensors.

6. A control device for controlling a robot provided with a sensor, the control device comprising:
a memory; and
a processor, wherein
the memory is configured to;
store coordinate system information related to a preset sensor coordinate system of the sensor, and
store setting information related to communication with the sensor;
the processor is configured to;
receive sensor data detected by the sensor based on the setting information;
calculate a physical quantity from the sensor data;
detect an angle of each of a plurality of axes included in the robot;
estimate a physical quantity related to the sensor through a forward transformation using the angles of the respective axes detected and a coordinate transformation of the sensor coordinate system; and
compare the physical quantity calculated from the sensor data against the physical quantity estimated, and determine that the processor is receiving sensor data from a sensor provided on another robot if a difference between the calculated physical quantity and the estimated physical quantity is greater than a preset threshold,
wherein, the robot includes movable members connected by the plurality of axes and servomotors disposed in the respective axes, and the control device drives the movable members by driving each of the servomotors.

7. The control device according to claim 6, further comprising a display configured to output an alert if the processor determines that the processor is receiving sensor data from a sensor provided on another robot.

8. The control device according to claim 7, wherein the display outputs, along with the alert, the setting information stored in the memory and the values of the sensor data received by the processor.

9. The control device according to claim 6, wherein the robot is provided with two or more sensors that respectively measure different physical quantities.

10. The control device according to claim 6, wherein the robot is provided with, as the sensor, a smart device that includes one or more sensors.

11. A control device for controlling a robot among a plurality of robots each provided with a sensor, the control device comprising:
a memory; and
a processor, wherein
the memory is configured to store coordinate system information related to a preset sensor coordinate system of the sensor provided on the robot to be controlled, and
the processor is configured to;
receive sensor data detected by each of the sensors provided on the respective robots including the robot to be controlled;
detect an angle of each of a plurality of axes included in the robot to be controlled;
estimate sensor values to be detected by the sensor of the robot to be controlled, through a forward transformation using the angles of the respective axes detected and a coordinate transformation of the sensor coordinate system; and
compare, for each of the sensors provided on the respective robots, values of the sensor data from the sensor against the sensor values estimated, and determine that the sensor is provided on a robot other than the robot to be controlled if a difference between the sensor data and the estimated sensor values is greater than a preset threshold,
wherein, the robot includes movable members connected by the plurality of axes and servomotors disposed in the respective axes, and the control device drives the movable members by driving each of the servomotors.

12. A control device for controlling a robot among a plurality of robots each provided with a sensor, the control device comprising:
a memory; and
a processor, wherein
the memory is configured to store coordinate system information related to a preset sensor coordinate system of the sensor provided on the robot to be controlled, and
the processor is configured to;
receive sensor data detected by each of the sensors provided on the respective robots including the robot to be controlled;
calculate a physical quantity from the sensor data from each of the sensors provided on the respective robots;
detect an angle of each of a plurality of axes included in the robot to be controlled;
estimate a physical quantity related to the sensor of the robot to be controlled, through a forward transformation using the angles of the respective axes detected and a coordinate transformation of the sensor coordinate system; and
compare, for each of the sensors provided on the respective robots, the physical quantity calculated from the sensor data from the sensor against the physical quantity estimated, and determine that the sensor is provided on a robot other than the robot to be controlled if a difference between the physical quantity calculated from the sensor data and the estimated physical quantity is greater than a preset threshold,
wherein, the robot includes movable members connected by the plurality of axes and servomotors disposed in the respective axes, and the control device drives the movable members by driving each of the servomotors.

* * * * *